(12) United States Patent
Feldman

(10) Patent No.: US 6,961,678 B2
(45) Date of Patent: Nov. 1, 2005

(54) METHOD AND SYSTEM FOR USING COOPERATIVE GAME THEORY TO RESOLVE STATISTICAL AND OTHER JOINT EFFECTS

(76) Inventor: Barry E. Feldman, 345 W. Fullerton, #1301, Chicago, IL (US) 60614

( * ) Notice: Subject to any disclaimer, the term of this patent is extended or adjusted under 35 U.S.C. 154(b) by 171 days.

(21) Appl. No.: 10/685,006

(22) Filed: Oct. 14, 2003

(65) Prior Publication Data

US 2004/0083078 A1 Apr. 29, 2004

Related U.S. Application Data

(63) Continuation-in-part of application No. 09/827,758, filed on Apr. 6, 2001, now Pat. No. 6,640,204.

(30) Foreign Application Priority Data

Apr. 5, 2002 (WO) ............... PCT/US02/10685

(51) Int. Cl.[7] ............................. G06F 17/18
(52) U.S. Cl. ............... 702/189; 703/1; 463/22
(58) Field of Search ............... 702/189, 179, 702/181, 187, 199; 273/460–461; 703/1, 2, 17, 22; 705/1, 80, 35, 36, 500; 340/323 R, 323 B; 434/128, 247, 248–257; 473/1, 4

(56) References Cited

U.S. PATENT DOCUMENTS

| | | | |
|---|---|---|---|
| 5,742,738 A | 4/1998 | Koza | |
| 5,826,244 A | 10/1998 | Huberman | |
| 5,991,741 A | 11/1999 | Speakman et al. | |
| 6,009,458 A | * 12/1999 | Hawkins et al. | ............ 709/203 |
| 6,026,383 A | 2/2000 | Ausubel | |
| 6,047,278 A | 4/2000 | Winkelmann | |
| 6,058,385 A | 5/2000 | Koza | |
| 6,078,901 A | 6/2000 | Ching | |
| 6,078,906 A | 6/2000 | Huberman | |
| 6,236,977 B1 | 5/2001 | Verba | |
| 6,640,204 B2 | 10/2003 | Feldman | |

OTHER PUBLICATIONS

Bring, Johan, (1996): "A Geometric Approach to Compare Variables in a Regression Model," *The American Statistician*, v. 50, n. 1.

G.P. Brinson and N. Falcher in "Measuring non–U.S. equity portfolio performance," *Journal of Portfolio Management*, Spring 1985, pp. 73–76.

(Continued)

*Primary Examiner*—Marc S. Hoff
*Assistant Examiner*—Edward Raymond
(74) *Attorney, Agent, or Firm*—Lesavich High-Tech Law Group, P.C.; Stephen Lesavich

(57) ABSTRACT

A method and system for cooperative resolution of statistical and other joint effects. The method and system include constructing controlled allocation games. Allocation patterns in a control game are used to determine value allocations in an allocation game. The method and system also includes approximating value functions for large cooperative games. The method and system may be used to construct statistical cooperative games and use cooperative game theory to resolve statistical joint effects in a variety of situations. The methods may be applicable to other types of joint effects problems such as those found in engineering, finance and other disciplines.

12 Claims, 7 Drawing Sheets

OTHER PUBLICATIONS

David R. Carino, "Combining Attribution Effects Over Time," *Journal of Portfolio Measurement*, Summer 1999, v.3, n. 4, pp. 5–14.

Chevan, Albert and Michael Sutherland (1991): "Hierarchical Partitioning," *The American Statistician*, v. 45, n. 2.

E. Fama and K. French, "Common risk factors in the returns on stocks and bonds," *Journal of Financial Economics*, v. 33, n. 1, 1993, pp. 3–56.

B. Feldman, "The Powerpoint," manuscript, 1998, 9$^{th}$ International Conference on Game Theory, Stony Brook.

B. Feldman, "The Proportional Value of a Cooperative Game," manuscript, 9$^{th}$ and 10$^{th}$ Stony Brook Game Theory conference, Jul. 1998 and 1999.

D.A. Harville, "Decomposition of Prediction Error," *Journal of the American Statistical Association*, v. 80, n. 389, 1985, pp. 132–138.

Kruskal, William (1987): "Relative Importance by Averaging Over Orderings," *The American Statistician*, v. 41, n. 1.

Lindeman, Richard H., P. F. Merenda, and R. Z. Gold (1980): "Introduction to Bivariate and Multivariate Analysis," Scott, Foresman, and Company, Glenview, Illinois, ISBN 0–673–15099–2, CH. 4, pp. 119–127.

R.B. Myerson, "Coalitions in cooperative games," Chapter 9 in *Game Theory: Analysis of Conflict*, Cambridge: Harvard University Press, 1992, pp. 417–482.

K.M. Ortmann, "The proportional value of a positive cooperative game," *Mathematical Methods of Operations Research*, v. 51, 2000, pp. 235–248.

H. Pesaran and Y. Shin, "Generalized impulse response analysis in linear multivariate models," *Economics Letters*, v. 58, 1998, pp. 17–29.

S. Ross "The Arbitrage Theory of Capital Asset Pricing," *Journal of Economic Theory*, v. 13, 1976, pp. 341–360.

L.M. Ruiz, F. Valenciano, and J.M. Zarzuelo, "The Family of Least Square Values for Transferable Utility Games," *Games and Economic Behavior*, v. 24, 1998, 109–130.

L.S. Shapley, "Additive and non–additive set functions," Ph.D. Thesis, Princeton University, 1953.

W.F. Sharpe, "Asset allocation: Management style and performance measurement," *Journal of Portfolio Management*, Winter 1992, pp. 7–19.

C. Sims, "Macroeconomics and reality," *Econometrica*, v. 48, 1980, pp. 1–48.

N.N. Vorob'ev and A.N. Liapounov, "The proper Shapley value," in *Game Theory and Applications IV*, L.A. Petrosjan and V.V. Mazalov, eds., Comack, NY: Nova Science Publishers, pp. 155–159.

R.O. Wilson, "Information, Efficiency, and the Core of an Economy," *Econometrica*, v. 46, 1978, pp. 807–816.

H.P. Young, ed., "Cost Allocation: Methods, Principles, Applications," New York: North Holland, 1985.

Soofi, E. S. et al., "A framework for measuring the importance of variables with applications to management research and decision models," *Decision Sciences*, v. 31, No. 3. 2000.

Lipovetsky, S. et al. "Analysis of regression in game theory approach," *Applied Stochastics Models in Business and Industry*, v. 17, Oct. 1, 2001.

* cited by examiner

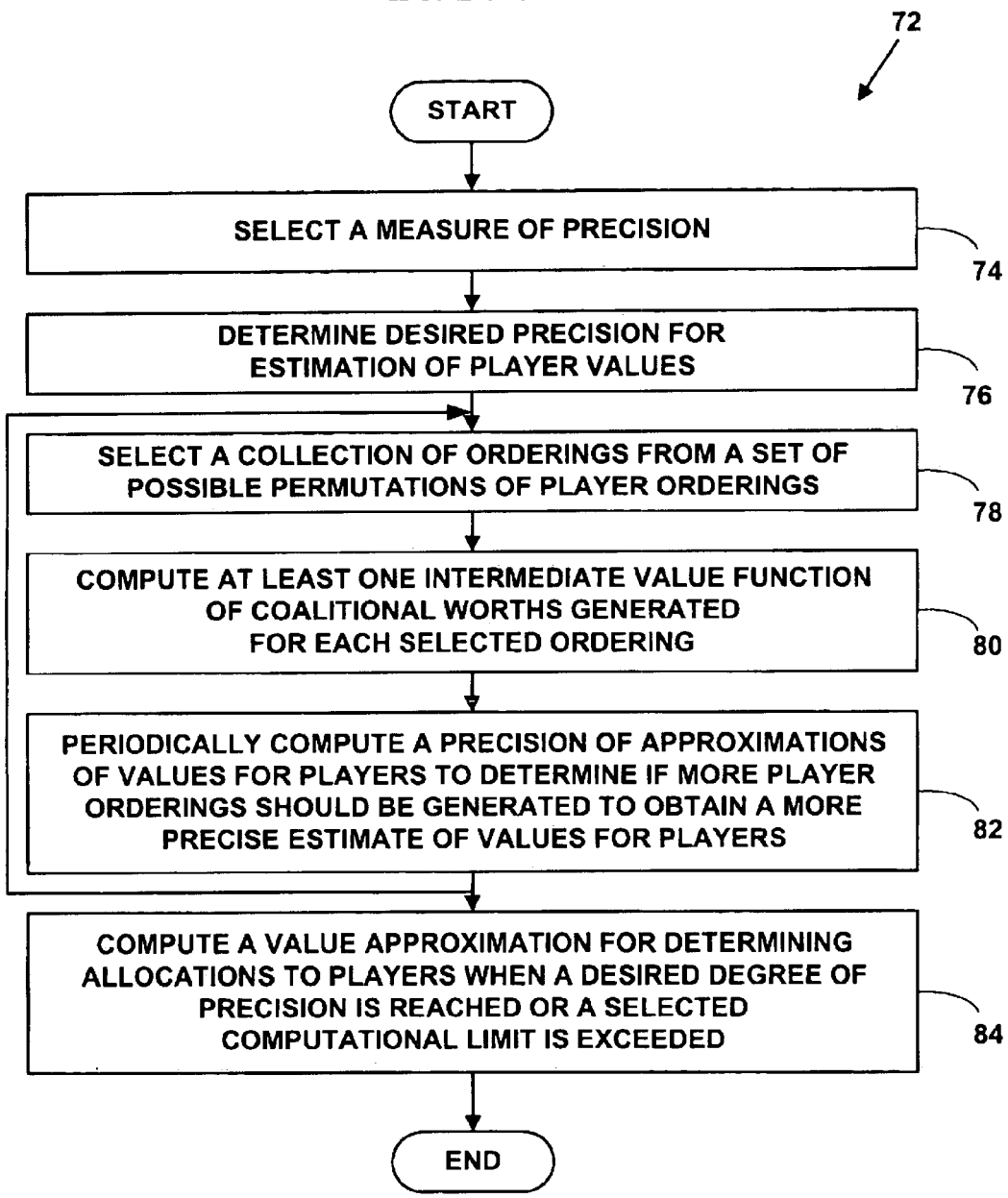

METHOD AND SYSTEM FOR USING COOPERATIVE GAME THEORY TO RESOLVE STATISTICAL AND OTHER JOINT EFFECTS

CROSS REFERENCE TO RELATED APPLICATIONS

This application is a Continuation-In-Part of U.S. application, Ser. No. 09/827,758, filed Apr. 6, 2001, now U.S. Pat. No. 6,640,204, that issued on Oct. 28, 2003.

FIELD OF THE INVENTION

The present invention relates to the fields of cooperative game theory and statistical analysis. More specifically, it relates to a method and system for using cooperative game theory to resolve joint effects in statistical analysis and other cooperative allocation problems.

BACKGROUND OF THE INVENTION

Many statistical procedures estimate how an outcome is affected by factors that may influence it. For example, a multivariate statistical model may represent variations of a dependent variable as a function of a set of independent variables. A limitation of these procedures is that they may not be able to completely resolve joint effects among two or more independent variables.

A "joint effect" is an effect that is the joint result of two or more factors. "Statistical joint effects" are those joint effects remaining after the application of statistical methods. "Cooperative resolution" is the application of cooperative game theory to resolve statistical joint effects.

A "performance measure" is a statistic derived from a statistical model that describes some relevant aspect of that model such as its quality or the properties of one of its variables. A performance measure may be related to a general consideration such as assessing the accuracy of a statistical model's predictions. Cooperative resolution can completely attribute the statistical model's performance, as reflected in a performance measure, to an underlying source such as the statistical model's independent variables.

Most performance measures fall in to one of two broad categories. The first category of performance measure gauges an overall "explanatory power" of a model. The explanatory power of a model is closely related to its accuracy. A typical measure of explanatory power is a percentage of variance of a dependent variable explained by a multivariate statistical model.

The second category of performance measure gauges a "total effect." Measures of total effect address the magnitude and direction of effects. An example of such a total effect measure is a predicted value of a dependent variable in a multivariate statistical model.

Some of the limits of the prior art with respect to the attribution of explanatory power and total effects may be illustrated with reference to a standard multivariate statistical model. A multivariate statistical model is commonly used to determine a mathematical relationship between its dependent and independent variables. One common measure of explanatory power is a model's "$R^2$" coefficient. This coefficient takes on values between zero percent and 100% in linear statistical models, a common statistical model. An $R^2$ of a model is a percentage of a variance of a dependent variable, i.e., a measure of its variation, explained by the model. The larger an $R^2$ value, the better the model describes a dependent variable.

The explanatory power of a multivariate statistical model is an example of a statistical joint effect. As is known in the art, in studies based on a single independent variable, it is common to report the percentage of variance explained by that variable. An example from the field of financial economics is E. Fama and K. French, "Common risk factors in the returns on stocks and bonds," *Journal of Financial Economics*, v. 33, n. 1. 1993, pp. 3–56. In multivariate statistical models, however, it may be difficult or impossible, relying only on the existing statistical arts, to isolate a total contribution of each independent variable.

The total effect of a multivariate statistical model in its estimation of a dependent variable is reflected in estimated coefficients for its independent variables. If there are no interaction variables, independent variables that represent joint variation of two or more other independent variables, then, under typical assumptions, it is possible to decompose this total effect into separate effects of the independent variables. However, in the presence of interaction variables there is no accepted method in the art for resolving the effects of the interaction variables to their component independent variables.

One principal accepted method to determine the explanatory power of independent variables in a multivariate statistical model is by assessment of their "statistical significance." An independent variable is statistically significant if a "significance test" determines that its true value is different than zero. As is known in the art, a significance test has a "confidence level." If a variable is statistically significant at the 95% confidence level, there is a 95% chance that its true value is not zero. An independent variable is not considered to have a "significant effect" on the dependent variable unless it is found to be statistically significant. Independent variables may be meaningfully ranked by their statistical significance. However, this ranking may provide limited insight into their relative contributions to explained variance.

Cooperative game theory can be used to resolve statistical joint effects problems. As is known in the art, "game theory" is a mathematical approach to the study of strategic interaction among people. Participants in these games are called "players." Cooperative game theory allows players to make contracts and has been used to solve problems of bargaining over the allocation of joint costs and benefits. A "coalition" is a group of players that have signed a binding cooperation agreement. A coalition may also comprise a single player.

A cooperative game is defined by assigning a "worth," i.e., a number, to each coalition in the game. The worth of a coalition describes how much it is capable of achieving if its players agree to act together. Joint effects in a cooperative game are reflected in the worths of coalitions in the game. In a cooperative game without joint effects, the worth of any coalition would be the sum of the worths of the individual players in the coalition.

There are many methods available to determine how the benefits of cooperation among all players should be distributed among the players. (Further information on cooperative game theory can be found in Chapter 9 of R. G. Myerson, *Game Theory: Analysis of Conflict*, Cambridge: Harvard University Press, 1992, pp. 417–482, which is incorporated by reference.) Cooperative game theory has long been proposed as a method to allocate joint costs or benefits among a group of players. In most theoretical work the actual joint costs or benefits are of an abstract nature. The practical aspects of using of cooperative game theory to allocate joint costs has received somewhat more attention.

See, for example, H. P. Young, ed., *Cost Allocation: Methods, Principles, Applications*, New York: North Holland, 1985.

Techniques from the prior art typically cannot be used to satisfactorily resolve statistical joint effects in cooperative games. Thus, it is desirable to use cooperative game theory to resolve statistical joint effects problems.

There have been attempts in the prior art to decompose joint explanatory power. For example, R. H. Lindeman, P. F. Merenda, and R. Z. Gold, in *Introduction to Bivariate and Multivariate Analysis*, 1980, Scott, Foresman, and Company, Glenview, Ill., ISBN 0-673-15099-2, pp. 119–127, describe a method of variance decomposition based on averaging the marginal contribution of a variable to $R^2$ over all possible orderings of variables. The authors discuss a method that generates the Shapley value of a variable in a statistical cooperative game using $R^2$ as a measure of explanatory power. W. Kruskal, in "Concepts of relative importance," *The American Statistician*, 1987, v. 41, n. 1, pp 6–10, and A. Chevan and M. Sutherland, in "Hierarchical partitioning," *The American Statistician*, 1991, v. 45, n. 2, 90–96, describe related methods based on the marginal contributions over all possible orderings of variables.

Also, it is known in the art that the explained variance in a regression can be decomposed into linear components. The variance assigned to an independent variable i in this decomposition is the sum over all variables j of the expression $\beta_i \sigma_{ij} \beta_j$, where $\beta_j$ is the regression coefficient associated with a variable j and $\sigma_{ij}$ is the covariance between independent variables i and j. This decomposition corresponds to the Shapley value of a statistical cooperative game using explained variance as a performance measure and using coefficients the complete statistical model to determine the worths of all coalitions.

Statistical cooperative games based on total effects may have coalitions with negative worths. It may be desirable to use proportional allocation principles in resolving these joint effects, however the proportional value cannot be applied to cooperative games with negative worths. It is desirable to demonstrate how proportional allocation effects determined in a first cooperative control game may be applied in a second cooperative allocation game that has negative coalitional worths through the use of an intergrated proportional control value of a controlled allocation game.

Statistical cooperative games may have large numbers of players. The calculation of value functions for large games can use large quantities of computer time. M. Conklin and S. Lipovetsky, in "Modem marketing research combinatorial computations: Shapley value versus TURF tools," 1998 S-Plus User Conference, disclose a method for approximating the Shapley and weighted Shapley values. It is desirable to approximate the powerpoint, the proportional value, and integrated proportional control values. It also desirable to show how the precision of value approximations may be ascertained.

SUMMARY OF THE INVENTION

In accordance with preferred embodiments of the present invention, some of the problems associated with resolving joint effects in statistical analysis are overcome. A method and system for cooperative resolution of joint statistical effects is presented.

One aspect of the present invention includes a method for constructing a controlled allocation game. Allocation patterns in a control game are used to determine value allocations in an allocation game.

Another aspect of the present invention includes a method for approximating value functions for large cooperative games.

The foregoing and other features and advantages of preferred embodiments of the present invention will be more readily apparent from the following detailed description. The detailed description proceeds with references to accompanying drawings.

BRIEF DESCRIPTION OF THE DRAWINGS

Preferred embodiments of the present inventions are described with reference to the following drawings, wherein:

FIG. 7 is a flow diagram illustrating a method for approximating value functions of large cooperative games.

DETAILED DESCRIPTION OF PREFERRED EMBODIMENTS

Exemplary Cooperative Resolution Computing System

Figure 1:
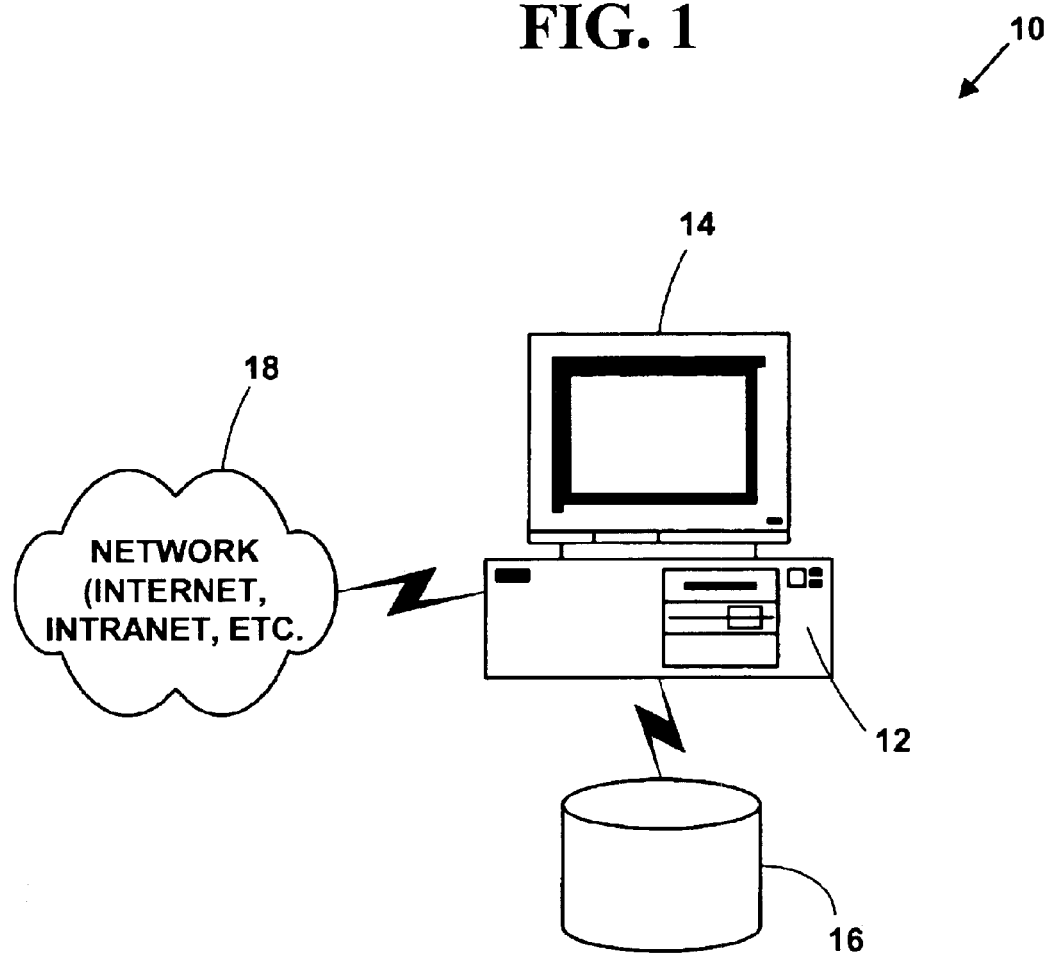
FIG. 1 is block diagram illustrating a cooperative game resolution computing system.

FIG. 1 illustrates a cooperative resolution computing system 10 for embodiments of the present invention. The cooperative game resolution system 10 includes a computer 12 with a computer display 14. In another embodiment of the present invention, the computer 12 may be replaced with a personal digital assistant ("PDA"), a laptop computer, a mobile computer, an Internet appliance or other similar mobile or hand-held electronic device. The computer 12 is associated with one or more databases 16 (one of which is illustrated) used to store data for the cooperative resolution system 10. The database 16 includes a memory system within the computer 12 or secondary storage associated with computer 12 such as a hard disk, floppy disk, optical disk, or other non-volatile mass storage devices. The computer 12 can also be in communications with a computer network 18 such as the Internet, an intranet, a Local Area Network ("LAN") or other computer network. Functionality of the cooperative game system 10 can also be distributed over plural computers 12 via the computer network 18.

An operating environment for the cooperative game system 10 includes a processing system with at least one high speed Central Processing Unit ("CPU") or other processor. In accordance with the practices of persons skilled in the art of computer programming, the present invention is described below with reference to acts and symbolic representations of operations that are performed by the processing system, unless indicated otherwise. Such acts and operations are referred to as being "computer-executed," "CPU executed," or "processor executed."

It will be appreciated that the acts and symbolically represented operations include the manipulation of electrical signals by the CPU. The electrical system represents data bits that cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, computer memory (e.g., RAM or ROM) and any other volatile or non-volatile mass storage system readable by the computer. The data bits on a computer readable medium are computer readable data. The computer readable medium includes cooperating or interconnected computer readable media, which exist exclusively on the processing system or distributed among multiple interconnected processing systems that may be local or remote to the processing system.

Cooperative Games and the Representation of Statistical Joint Effects

Figure 2:
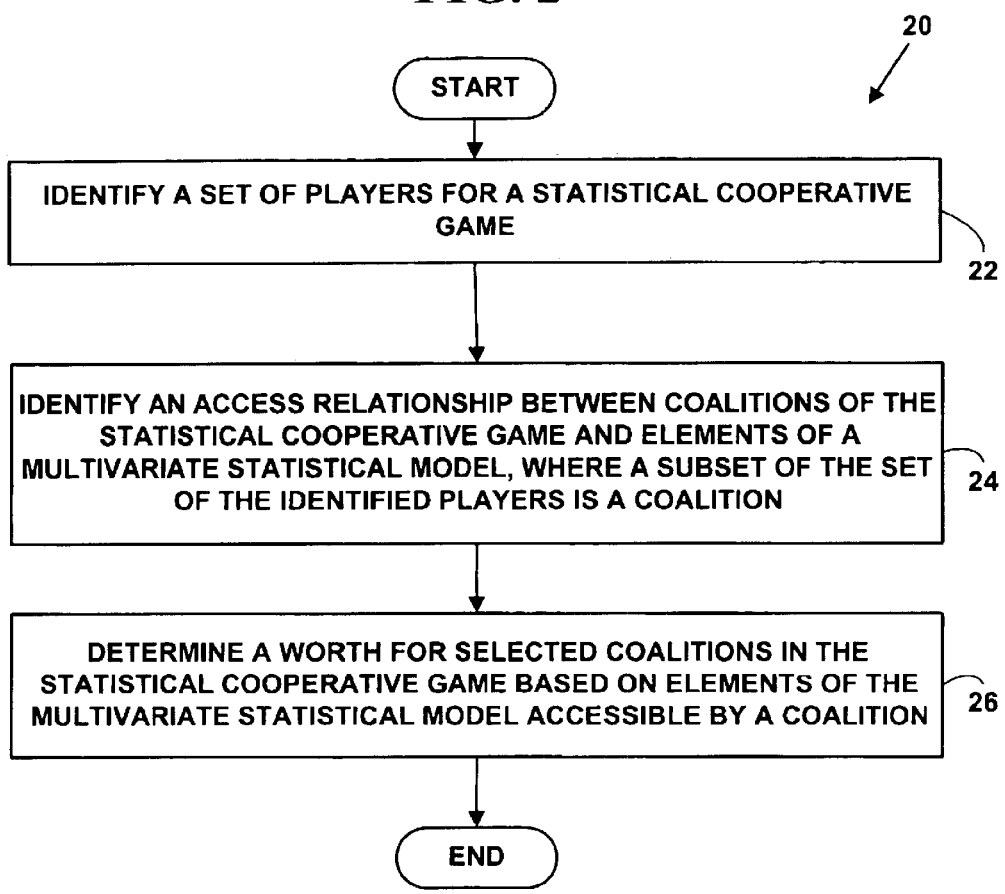
FIG. 2 is a flow diagram illustrating a method for constructing a statistical cooperative game.

FIG. 2 is a flow diagram illustrating a Method 20 for constructing a statistical cooperative game. At Step 22, a set of players for a statistical cooperative game is identified. At Step 24, an access relationship is identified between coalitions of the statistical cooperative game and elements of a multivariate statistical model. A selected subset of the set of the identified players is a coalition. At Step 26, a worth is determined for selected coalitions in the statistical cooperative game based on elements of the multivariate statistical model accessible by a coalition.

Method 20 is illustrated with exemplary embodiments of the present invention. However, the present invention is not limited to such embodiments and other embodiments can also be used to practice the invention.

At Step 22, a set of players is identified for a statistical cooperative game. A "statistical cooperative game" defined on a set of "players" assigns a "worth" to subsets of the set of players. A selected subset of available players is a "coalition." A coalition is a single player or plural players, that have made a binding cooperation agreement to act together. An empty set with no available players is also formally a coalition. At Step 24, an access relationship is identified between coalitions of the statistical cooperative game and elements of a multivariate statistical model. The "access relationship" comprises a set of rules determining, for coalitions in the identified set of coalitions, any elements that are accessible by the coalition and how accessible elements may be used by a coalition in the multivariate statistical model. At Step 26, a worth is determined for coalitions selected in the statistical cooperative game based on elements of the multivariate statistical model accessible by a coalition. A "worth" of a coalition is what these players can achieve though mutual cooperation. In the type of statistical cooperative game used for preferred embodiments of the present invention, the worth of a coalition is a value or a number. However, the present invention is not limited to such an embodiment and other types of values or worths can also be used. By convention, the worth of an empty set is defined to be zero.

In another embodiment of the present invention, the steps of Method 20 are applied in a recursive manner to allocate a value allocated to a player accessing a plurality of variables in a first statistical cooperative game on a basis of a second cooperative game embodying a second set of players.

A set of all available players, also known as a "grand coalition," is denoted by "N," and N={1, 2, . . . , n}, where the braces "{ }" identify enclosed elements as members of a set and "n" is a number of players in a game. Numbers are used to identify players only for convenience. A cooperative game is typically represented by a lower case letter, typically, "v." A coalition is typically represented by "S," thus $S \subseteq N$. That is, S is a subset of N. A worth for a coalition S is identified as "v(S)," and "v(S)=5" states that the worth of coalition S in cooperative game v is 5. To simplify notation herein after, the coalition {1,2} may be written as "12," and, thus v({1,2})=v(12).

Typically, as described above, the worth of a coalition is independent of the possible organization of other players in the game that are not members of the coalitions. This is known in the art as a cooperative game in "coalitional form." There is also a cooperative game in "partition function form" in which the worth of a coalition depends on the "coalitional structure" formed by all players. This is a partition of the set of players that contains the coalition. In this case the worth of a coalition may be referred to as v(S,Q) where Q is a partition containing S.

The term "value" has distinct meanings in the different arts related to the present invention. In a general context, value has the common meaning of the benefit, importance, or worthiness of an object. In the statistical arts, a variable, or an observation of a variable, may have a value. This refers to a number assigned to the variable or observation. In cooperative game theory, value has two specialized meanings. First, it refers to a type of function that may be applied to a game, called a "value function." Second, a value function assigns a value to players in a game. This value may be understood as an expected payoff to a player as a consequence of participation in the game. However, the present invention is not limited to these meanings of value and other meanings of value can also be used.

Access Relationships

Figure 3:
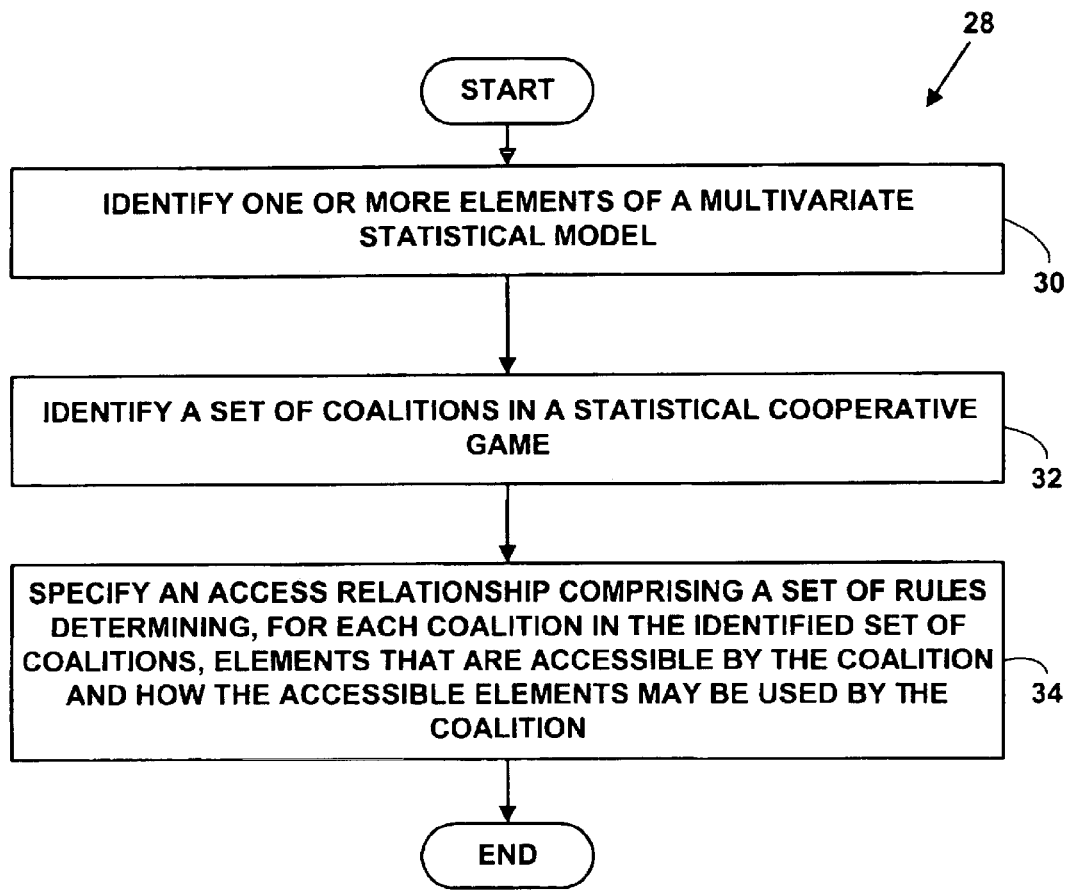
FIG. 3 is flow diagram illustrating construction of an access relationship between a statistical cooperative game and a multivariate statistical model.

FIG. 3 is a flow diagram illustrating a Method 28 for constructing an access relationship between a statistical cooperative game and a multivariate statistical model.

At Step 30, one or more elements of the multivariate statistical model are identified. At Step 32, a set of coalitions is identified in the statistical cooperative game. At Step 34, an access relationship is specified. The access relationship comprises a set of rules determining, for each coalition in the identified set of coalitions, any elements that are accessible by the coalition and how accessible elements may be used by the coalition.

Method 28 is illustrated with exemplary embodiments of the present invention. However the present invention is not limited to such embodiments and other embodiments can also be used to practice the invention.

In one illustrative embodiment, at Step 30, one or more elements of the multivariate statistical model are identified. The multivariate statistical model may include for example, but is not limited to, an ordinary least squares model, a VAR time series model, an analysis of categorical effects model, an analysis of changes in proportions model, a covariance matrix, a capital asset pricing model, an arbitrage pricing theory model, an options pricing model, a derivatives pricing model, a Sharpe style analysis model, a macroeconomic model, a price forecasting model, a sales forecasting model, or a basic or generalized Brinson and Fachler manager attribution model, or other models.

In preferred embodiments of this invention, the elements identified at Step 30 are "independent variables" of an analysis. Such independent variables include information whose statistical joint effects or explanatory power is to be allocated among the players of the cooperative game.

However, in certain types of multivariate statistical models, other elements may be of interest. For example, in time series analyses involving vector autoregression (VAR), all variables may be endogenous to the model, and hence, not independent. Further, it may be desirable to identify different "lagged values" of a variable as different elements of the model. In regression with instrumental variables (IV), and when using the generalized method of moments (GMM), it may be desirable to include the instruments as elements of the model.

At Step 32, a set of coalitions in the statistical cooperative game is identified. The choice of coalitions to be identified is guided by a number of factors. One primary factor regards a number of players in the cooperative game. Cooperative resolution will resolve all joint effects between the selected players. Players may be identified with individual elements of the multivariate statistical model, they may have access to multiple elements, or more complex patterns may be desired. Once a set of players is determined, a set of allowable coalitions of players may be restricted. This may be desirable when the allocation procedure to be used does not require the worths of all coalitions in the cooperative game.

For example, application of the Nash Bargaining Solution requires only the worths of individual players and the grand coalition (see Equation 19), as known to those skilled in the art. Some solution concepts may only require coalitions up to a certain number of players. In one preferred embodiment of the present invention, the set of coalitions identified will be a set of all possible coalitions of players. In another preferred embodiment of the present invention, the set of coalitions will be a set of less than all possible coalitions of players. At least two players are identified in order for nontrivial cooperative resolution to take place. These players are abstract entities that may access variables in the multivariate statistical model. It is also possible that these players will additionally represent real entities.

At Step 34, an "access relationship" is specified. The access relationship comprises a set of rules determining, for coalitions in the identified set of collations, any elements that are accessible by the coalition and how accessible elements may be used by the coalition. The access relationship is determined between coalitions of the cooperative game and the elements of the multivariate statistical model. The precise meaning of an access relationship will depend on a desired application. In a preferred embodiment of the current invention, a coalition has access to a variable if the coalition can use the variable in a statistical procedure. An access relationship may specify restrictions on the use of a variable. For example, access to an independent variable may only allow it to be directly entered into a statistical procedure. A variable transformation or interaction term may then be considered to be an additional independent variable.

A coalition has "primary access" to a variable if no coalition not including, as a subset, the coalition with primary access can access the variable. A coalition may consist of a single player. It is possible that no coalition has primary access to a variable. However, at most one coalition can have primary access.

An access relationship may be explicitly defined, as, for example, if choices among alternatives are made through a graphical user interface (GUI), it may be determined by logic embedded in hardware or software implementing the access relationship, or it may be created implicitly or by default in the implementation of Method 28.

A one-to-one transferable access relationship between independent variables in the multivariate statistical model and players in the statistical cooperative game is the primary and default access relationship. In this case each player has primary access to an independent variable, there is no independent variable not assigned a player with primary access, and the independent variables accessible by any selected coalition are exactly those whose primary access players are members of the selected coalition. The one-to-one transferable relationship between players and independent variables allows statistical joint effects to be apportioned between all independent variables.

There are many alternative access relationships that might also be used. The choice of a proper form of the access relationship is based on the understanding of the structural or theoretical relationships between the independent variables and their function in determining a worth of a coalition.

A common variation on the one-to-one transferable access relationship arises from understanding of the role of an "intercept term" in a multivariate statistical model to be that of a normalizing factor. An intercept term is represented by constructing a constant independent variable, typically a vector of ones. The regression coefficient for this variable is the intercept term. If an intercept term represents no intrinsic information but is necessary to avoid biased estimates of the other coefficients, it is a normalizing factor. In such a situation, the constant vector should be accessible by every coalition in the game. The resulting interpretation is that any benefit from this variable is distributed among all players of the game (and the other independent variables).

In other situations, however, it might be considered that the value of an intercept term contributed information, and, thus that it should be treated like other independent variables. Thus, in many statistical models, the null hypothesis is that the intercept term is zero. Deviation of the intercept term from zero is then indicative of the action of some factor such as managerial ability or a health effect.

Another frequent device used in statistical procedures is an "interaction variable" that reflects the joint presence of two or more independent variables. For example, a exercise/diet interaction variable could have the value "one" whenever the patient both engaged in vigorous exercise and ate a healthy diet, and the value "zero" otherwise. A single player could be assigned primary access to this interaction variable. However, it will often be advantageous to give primary access to an interaction variable to the minimal coalition of players with access to all component variables. By default, an access relationship does not allow a coalition to create an interaction variable based on a group of independent variables simply because it can access those variables. However, this ability could be specified in a particular access relationship.

In the example described above, all coalitions accessing both the exercise and diet variables could also access the interaction variable; but a coalition that could access only one of these variables or neither could not access the interaction variable. The cooperative resolution process will then divide the explanatory power of the interaction term between the interacting variables. Allowing the interaction term to have primary access by a single player, on the other hand, would make it possible to estimate the importance of the interaction effect itself.

Another variation on a one-to-one correspondence between players and independent variables that will be considered here is the case of a number of binary variables accessible by a single player. This may be desirable when all binary variables are related to a similar factor. For example, they might correspond to different age levels in a study population. The effect of grouping them together would be to determine the overall importance of age. If these binary variables are, instead, accessible by separate players, cooperative resolution would determine the importance of each age interval separately.

There are also lagged realizations of an independent variable. For example, consumption, at time t, $C_t$ might be modeled as a function of variables including current and lagged income, $I_t$ and $I_{t-1}$. The influences of the current and lagged values of I could be grouped together or analyzed separately. In the later case, they would be accessible by separate players.

A general rule can be defined that an access relationship will ordinarily satisfy. If the coalition S is a subset of a coalition T then all independent variables collectively accessible by S are accessible by T as well. If this requirement is not met, the resulting game may not have a logical interpretation. The notation A(S) refers to the elements collectively accessible by the coalition S. Equation 1 represents the general rule:

$$\text{if } S \subset T, \text{ then } A(S) \subseteq A(T). \tag{1}$$

Exceptions to this rule are within the scope of the present invention, however, it is contemplated that they will be rare.

In games in partition function form, it is possible that an access relationship depends on the complete coalitional structure present in the game. Thus, the independent variables accessible by a coalition typically may not be determined without reference to a complete coalitional structure. In this case the independent variables accessible by a coalition may be referenced as A (S,Q). A restatement of Equation 1 extending the general rule to the partition function game is if $Q=\{S,Q_1,\ldots,Q_k\}$ and $Q^*=\{T,Q^*_1,\ldots,Q^*_{kJ}\}$, with $S \subset T$ and $Q^*_i \subseteq Q_i$ for all i=1, . . . , k, then $A(S,Q) \subseteq A(T,Q^*)$.

In another embodiment of the present invention, Method 28 can be used at Step 24 of Method 20. However, the present invention is not limited to such an embodiment and Method 28 is also used as a stand alone method independently from Method 20 for determining an access relationship.

Determining the Worth of a Coalition in a Statistical Cooperative Game

Figure 4:
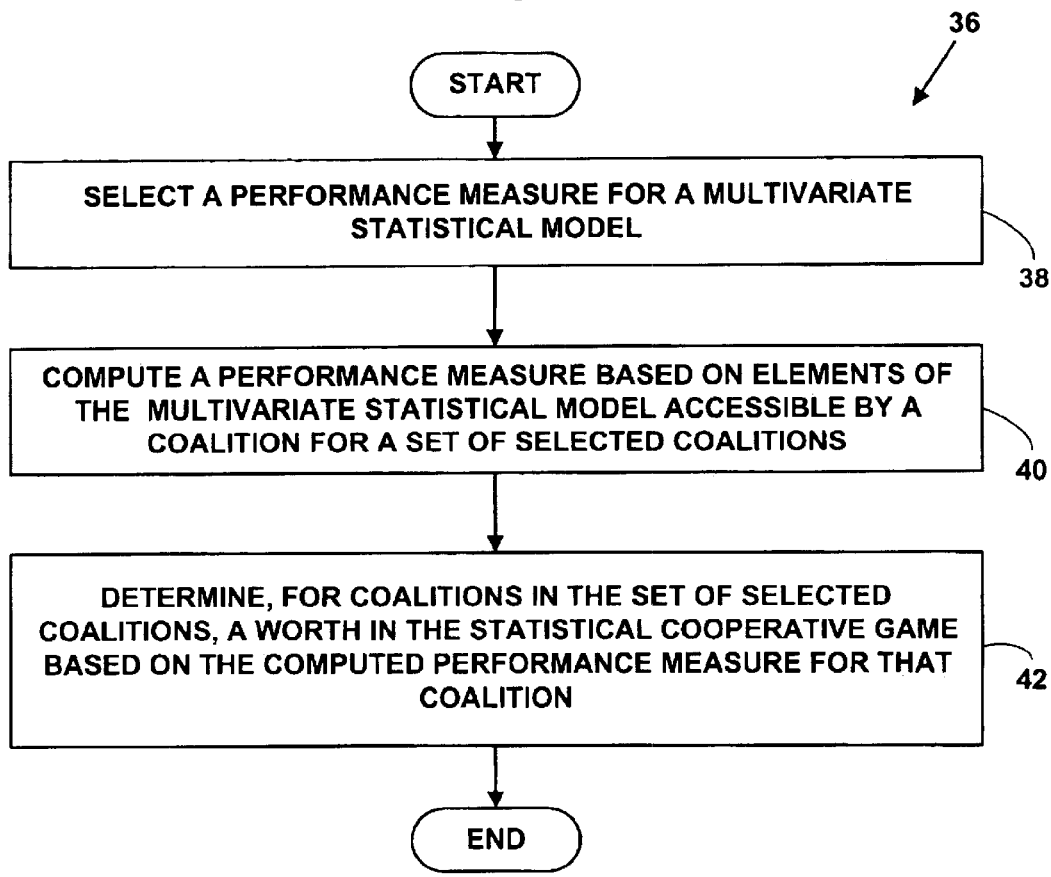
FIG. 4 is a flow diagram illustrating determination of a worth of a coalition in a statistical cooperative game.

FIG. 4 is a flow diagram illustrating a Method 36 for determining a worth for selected coalitions in a statistical cooperative game. At Step 38, a performance measure for a multivariate statistical model is selected. At Step 40, a performance measure is computed based on elements of a multivariate statistical model accessible by a coalition for a set of selected coalitions. At Step 42, a worth of each coalition from the set of selected coalitions in the statistical cooperative game is determined based on the computed performance measure for that coalition.

Method 36 is illustrated with exemplary embodiments of the present invention. However, the present invention is not limited to such embodiments and other embodiments can also be used to practice the invention.

The type of game constructed may be either in coalitional, partition function, or other form. In partition function games, the worth of a coalition may also be influenced by the independent variables accessible by other coalitions in the coalition structure.

This approach is very different from traditional methods of constructing cooperative games. Information that could be represented as independent variables might be used in the determination of the worth of a coalition in the prior art, however the worth of a coalition would be determined by values of this variable that are particular to it. For example, in a cost allocation game used to allocate utility costs, information regarding electric usage might be an input to determining the worth of a coalition. However, the relevant information would be the electric usage of members of the coalition. In the present invention there need not be direct association between independent variables and coalitions except those determined by an access relationship. It is, however, also possible that other factors besides an access relationship enter into the determination of the worth of a coalition.

At Step 38, a performance measure of a multivariate statistical model is selected. There are a great many possible performance measures that can be selected. One class of performance measure considers the overall explanatory power of the entire model. An example of this type of measure is an $R^2$ coefficient. As a result of this type of analysis it might be concluded that "independent variable A explains 25% of a variance of a dependent variable B." Another class of performance measure is based on a dependent variable and will typically result in conclusions such as "variable A adds three years to the average patient's life expectancy." The resolution of statistical joint effects on a dependent variable may be studied on the level of the model itself or on the level of the individual observations that comprise the model. Other examples of performance measures include, but are not limited to, an unadjusted $R^2$ statistic, an $R^{2*}$ statistic (defined below), a predicted value of a dependent variable, a value of a log likelihood function, a variance of a forecast observation, or an out of sample mean square error.

At Step 40, a performance measure is computed for selected coalitions based on the elements of the multivariate statistical model accessible by a coalition. Exemplary methods for computing several performance measures are described assuming that ordinary least squares (OLS) is a selected multivariate statistical modeling procedure and independent variables of a model are elements on which an access relationship is based. However, other assumptions can also be used.

For example, at Step 40, let $y=(y_{(1)}, y_{(2)}, \ldots, y_{(t)})$ be a vector that represents a sequence of t observations of a dependent variable. Similarly, let X be a (t×m) matrix comprising a set of m vectors of t observations each, $x_i=(x_{i(1)}, x_{i(2)}, \ldots, x_{i(t)})$, that represent sequences of t observations of independent variables $X=(x_1, x_2, \ldots, x_m)$ with $X_{ij}=x_{j(i)}$. The linear regression of y onto X yields an m-vector of coefficients $\beta=(\beta_{(1)}, \beta_{(2)}, \ldots, \beta_{(m)})$. This regression may be computed through application of the formula illustrated in Equation 2:

$$\beta=(X'X)^{-1}X'y \tag{2}$$

where X' is the transpose of X, the matrix inverse of a square matrix X is written $X^{-1}$, and multiplication is by matrix multiplication rules.

The use of $R^2$ as a performance measure for the study of explanatory power proceeds as follows. An $R^2$ statistic is calculated. An error vector is illustrated in Equation 3:

$$\epsilon=y-X'\beta \tag{3}$$

where $\epsilon$ is the difference between the estimated and true values of the dependent variable. A sum of squared error (SSE) of the regression can then be written as SSE=$\epsilon'\epsilon$. The total sum of squares of the regression (SST) can be written SST=y'y−t$\bar{y}^2$, where $\bar{y}$ is the average value of y. The $R^2$ statistic of the regression may then be calculated as is illustrated in Equation 4.

$$R^2=1-SSE/SST \tag{4}$$

When the performance contribution of an intercept term is to be studied it may be desired to used a revised definition of $R^2$, an $R^{2*}$ statistic calculated by the formula in Equation 5.

$$R^{2*}=1-SSE/SST^*, \quad (5)$$

where $SST^*=y'y$.

A performance measure for a coalition S may also be determined as follows. For any coalition S, let $X_S$ represent the matrix composed of the vectors $x_i$ for all independent variables i contained in the set A(S). Also, let $\beta_S$ be the vector of coefficients associated with the variables in A(S). Compute $\beta_S=(X_S'X_S)^{-1}X_S'y$ and $\epsilon_S=y-X_S'\beta_S$, where $\epsilon_S$ is the error vector associated with the regression based on the variables in S. Define $SSE_S=\epsilon_S'\epsilon_S$ and, thus $R_S^2=1-SSE_S/SST$, where SST is defined above. Then set $v(S)=R_S^2$. Here "v" is a cooperative game based directly on the performance measure.

Performance measures based on total effects may be based either on submodels of the complete multivariate statistical model or on the full multivariate statistical model. An estimated value of a dependent variable, the vector y, is the vector $X'\beta$. An estimated value of an single observation k with characteristics $x_k$ would then be $x_k'\beta$. The vector $x_k$ may represent an actual observation in the data, i.e., $x_k$ may be a row vector of the matrix X, or an out-of-sample observation or a hypothetical case to be forecast.

In order to construct a total effects performance measure for OLS models based on submodels and using estimated values of an observation of the dependent variable as a performance measure of total effects, set v(S) as illustrated in Equation 6:

$$v(S)=x^S_k{}'\beta_S, \quad (6)$$

where $x^S_k$ is a vector of the values of the independent variables accessible by S of the $k^{th}$ observation of data or a combination of values of independent variables corresponding to a value of a dependent variable to be forecast and $\beta_S$ is the vector of corresponding coefficients. This approach to total effects provides a new way to understand the interaction of independent variables.

Another approach to computing a total performance measure for OLS models based on submodels would be to set $v(S)=\underline{x}^{S'}\beta_S$, where $\underline{x}^S$ is a vector of average values of the independent variables accessible by S over all observations of the dataset, or over some subset of observations.

Alternatively, a total effect performance measure for a coalition may be based on the complete multivariate statistical model. The worth of a coalition S may be determined in ways completely analogous to those just described. Define $\underline{\beta}_S$ to be a vector resulting from the restriction of $\beta$, as estimated by Equation 3, to coefficients of independent variables accessible by S. Then, as illustrated in Equation 7, set $$v(S)=x_S'\underline{\beta}_S. \quad (7)$$

Note that this performance measure has little utility unless interaction variables are included in the multivariate statistical model and a nontrivial access relationship is employed. In particular, when a one-to-one transferable access relationship is used, there will be no statistical joint effects to resolve.

A performance measure of explanatory power based only on the complete multivariate statistical model may also be constructed as is illustrated it Equation 8. Let $\underline{\epsilon}_S=y-X_S'\underline{\beta}_S$ and set $$v(S)=1-\underline{\epsilon}_S'\underline{\epsilon}_S/SST. \quad (8)$$

Explanatory power may also be measured with respect to a forecast value of a dependent variable. Let x* be a vector of independent variable values used to forecast $y^*=x^{*\prime}\underline{\beta}$. Also let $x^*_S$ be the restriction of x* to the variables accessible by the coalition S. Then the variance of the expected value of y* conditional on the coalition forming the expectation is illustrated in Equations 9 and 10:

$$Var_S(E_S(y^*))=\sigma_S^2(1+x^*_S{}'(X'_S X_S)^{-1}x^*_S), \quad (9)$$

where $$\sigma_S^2=SSE_S/(n-s) \quad (10)$$

is the variance of the regression estimated when the submodel is restricted to the independent variables accessible by S and s is the number of independent variables accessible by S. For S=N, this is the forecast variance for the complete multivariate statistical model.

The choice among alternative performance measures is made according to the purpose of the cooperative resolution process and the understanding of an individual skilled in the statistical arts. For most purposes, it is contemplated that the preferred embodiments of performance measures of explanatory power will be based on the construction of submodels, while total effects measures will tend to be based only on the complete model. Note that, formally, it is the access relationship that determines whether a submodel is computed based on the variables a coalition has access to or access to the coefficients of the complete model is determined by the access relationship.

Again referring to FIG. 4 at Step 42, a worth of coalitions from the selected set of coalitions is computed based on the computed performance measure for the coalition. In one embodiment of the present invention, the computation of the performance measure is itself represented as a construction of a cooperative game. However, the present invention is not limited to such an embodiment. The worth of a coalition may be set equal to the performance measure for the coalition or it may be a function of the performance measure.

An example of worth as a function of a performance measure is a "dual" game. Let the worth of a coalition in the game "v" be the computed performance measure of Step 36. Let "w" be the dual game as is illustrated in Equation 11. Then in a coalitional form game, and for any coalition S, $$w(S)=v(N)-v(N\backslash S), \quad (11)$$

where S is any coalition of the players in N and "\" is the set subtraction operator. (i.e., the set N\S includes the players in N that are not in S.) A dual game is constructed in the preferred embodiments of the present invention when using explanatory power performance measures. In one embodiment of the present invention, Method 36 can be used at Step 26 of Method 20. However, the present invention is not limited to such an embodiment and Method 36 is also used as a stand alone method independent from Method 20 to determine a worth of a coalition.

Allocation Procedures

A cooperative allocation procedure may be applied to the statistical cooperative game constructed with Method 20 and/or Method 28 in order to determine allocations to players of the game. Preferred embodiments of the present invention use "point" allocation procedures for this purpose. A point solution procedure determines a unique solution. A value function of a cooperative game is a type of point allocation procedure. A value function determines unique allocation of the entire worth of the grand coalition, or possibly, a subcoalition, to the members of that coalition.

Virtually any value function may be used in this attribution process, however, four such functions described here. These are the Shapley and weighted Shapely values (L. S. Shapley, "Additive and Non-Additive Set Functions," Ph.D. Thesis, Princeton University, 1953), the proportional value (B. Feldman, "The proportional value of a cooperative game," 1999, and K. M. Ortmann, "The proportional value of a positive cooperative game," *Mathematical Method of Operations Research*, v. 51, 2000, pp. 235–248) and the powerpoint ("The Powerpoint," B. Feldman, 1998, and N. N. Vorob'ev and A. N. Liapounov, "The Proper Shapley Value," in *Game Theory and Applications IV*, L. A. Petrosjan and V. V. Mazalov, eds., Comack, N.Y.: Nova Science Publishers, 1999).

A unified description of this allocation process is presented based on a method of potential functions. These potential functions may be calculated recursively. First, the potential "P" for the game v used to calculate the Shapley value is assigned. For example, assign P({ }, v)=zero and apply the formula illustrated in Equation 12 recursively to all coalitions S⊆N:

$$P(S, v) = \frac{1}{s}\left(v(S) + \sum_{i \in S} P(S \setminus i, v)\right). \quad (12)$$

The Shapley value for a player i in the game v is then illustrated by Equation 13:

$$Sh_i(v) = P(N, v) - P(N \setminus i, v) \quad (13)$$

Similarly a proportional, or ratio, potential function may be constructed as follows. Set R({ }, v)=one and determine R(S, v) recursively using Equation 14:

$$R(S, v) = v(S)\left(\sum_{i \in S} \frac{1}{R(S \setminus i, v)}\right)^{-1}. \quad (14)$$

Then the proportional value of player i in the game v is determined by Equation 15:

$$PV_i(v) = \frac{R(N, v)}{R(N \setminus i, v)} \quad (15)$$

A similar method may be used for the calculation of weighted Shapley values. The weighted Shapley value is a value based on an exogenously specified vector of weights $\omega=(\omega_1, \omega_2, \ldots, \omega_n)$ with $\omega_i > 0$ for all i. Again, set P({ }, v)=zero. Equation 16 illustrates the computation of potentials for weighted Shapley values:

$$P_\omega(S, v) = \frac{1}{\sum_{i \in S} \omega_i}\left(v(S) + \sum_{i \in S} \omega_i P(S \setminus i, v)\right). \quad (16)$$

The weighted Shapley value for player i in game v using weights ω is illustrated by Equation 17.

$$wSh_i(v,\omega) = P_\omega(N, v) - P_\omega(N \setminus i, v) \quad (17)$$

A "powerpoint" of a game may be found by identifying an allocation such that using this allocation as the weights ω to be used in the computation of the weighted Shapley value leads to the value assigned to players being precisely their weight. That is, the values allocated by the powerpoint satisfy Equation 18, $$wSh_i(v,\omega) = \omega_i, \quad (18)$$

for every player i.

It can be seen that these value functions are based on the worths of all coalitions in the game. However, other solutions require use of less information. For example, the Nash bargaining solution requires only v(N) and the individual worths v(i) for all players i. The Nash Bargaining Solution is illustrated in Equation 19.

$$NBS_i(v) = \frac{1}{n}\left(v(N) - \sum_{i \in N} v(i)\right) + v(i). \quad (19)$$

The allocation functions described satisfy an additive efficiency restriction that the sum of all allocations to individual players must equal the worth of the grand coalition. It may sometimes be desirable to use an allocation function to distribute the worth of a subcoalition. The allocation procedures described here may be used for this purpose by substituting this coalition S for the grand coalition N as appropriate in Equations 13, 15, 17, 18, or 19.

For the purposes of illustrating the construction of dual games and the determining the value of a game, consider the following exemplary three-player game v illustrated in Table 1.

TABLE 1 v({}) = 0, v(1) = .324, v(2) = .501, v(3) = .286,
v(12) = .623, v(13) = .371, v(23) = .790, v(123) = .823

The Shapley value of this game can be computed and found to be Sh(v)=[0.154, 0.452, 0.218], for players 1, 2, and 3, respectively. Similarly the proportional value is Pv(v)=[0.174, 0.445, 0.204] and the powerpoint is Ppt(v)=[0.183, 0.441, 0.199].

The dual game w defined by w(S)=v(N)−v(N\S) for all S can be computed as illustrated in Table 2.

TABLE 2 w({}) = 0, w(1) = .033, w(2) = .452, w(3) = .200,
w(12) = .537, w(13) = .322, w(23) = .499, w(123) = .823

The proportional value of w is Pv(w)=[0.064, 0.489, 0.270]. The Shapley value of a dual game is the same as the Shapley value of the original game: Sh(w)=Sh(v). The powerpoint of w is Ppt(w)=[0.072, 0.487, 0.264].

Simplified Calculation of Some Values in Total Effects Games with Interactions

If total effects are to be estimated for a multivariate statistical model with interaction variables and based on the complete statistical model, the Shapley and weighted Shapley values may be computed according to a more efficient method based on the potential representation of these values described above. Let $x_S$ and $\beta_S$ vectors of values and corresponding coefficients of variables in a total effects model that: (1) S can access; and (2) no subcoalition of S can access. The vector $x_S$ may represent average values of the independent variables, values of a particular sample observation, a forecast value, or some other function of these variables. Let $d(S) = x_S' \beta_S$. Then for any S, the sum of d(T) over all subsets of S yields the worth of S, as illustrated in Equation 20:

$$v(S) = \sum_{T \subseteq S} d(T). \tag{20}$$

Let |T| be the number of players in the coalition T. The Shapley value of v for a player i may be calculated as illustrated in Equation 21:

$$Sh_i(v) = \sum_{T \ni i} \frac{d(T)}{|T|}, \tag{21}$$

where the sum is over all coalitions T that contain player i. Similarly, the weighted Shapley value with weight vector ω can be calculated as illustrated in Equation 22:

$$wSh_i(v, \omega) = \sum_{T \ni i} \frac{\omega}{\sum_{j \in T} \omega_j} d(T). \tag{22}$$

These derivations are related to conceptualizing the regression as a "scalable game" and calculating the Aumann-Shapley or weighted Aumann-Shapley prices of the game. They have the advantage of being calculable directly from the results of the multivariate statistical model without the explicit construction of a cooperative game.

Total effects attributions based on the complete multivariate statistical model may be calculated in this manner. However, the present invention is not limited to such calculations and other calculations can also be used.

Multiplicative Value Allocation

The present invention discloses methods for allocating the worth of a coalition in a cooperative game on a multiplicative interaction basis. That is, for any such allocation, the product of values allocated to individual players in the coalition is equal to the worth of the coalition, when that product is computed in the appropriate way. This stands in contrast to additive value allocation procedures. Cooperative game theory has been concerned with the division of costs or benefits in a manner similar to the division of a sum of money. The logic of multiplicative allocation can be illustrated in the context of performance attribution. Assume a management team produces a 20% growth in sales over a single year. Considering the outcome in percentage rather than absolute dollar terms makes sense because it places the outcome in relative terms. Allocating that performance among the members of the team could be done on an additive or multiplicative basis. However, assume such performance attributions are done for several years. Then the allocation ison a multiplicative basis if the combination of each manager's cumulative performance will be equal the cumulative performance of the firm. The only way these attributions can be done consistently is on a multiplicative basis. (See, for example, David R. Carino, "Combining attribution effects over time," *Journal of Portfolio Measurement*, Summer 1999, v. 3. n. 4.)

The precise definition of a multiplicative product depends on the quantities being multiplied. Generally, quantities to be allocated and allocations will be percentage changes. In this case, one is added to all percentages to be multiplied. Then the resulting terms are multiplied. Finally, one is subtracted again. Thus, the product of two percentages $p_1$ and $p_2$ is $(1+p_1)(1+p_2)-1$. Sometimes the quantities to be allocated will be ratios. In this case the multiplicative product is the product of the ratios.

Figure 5:
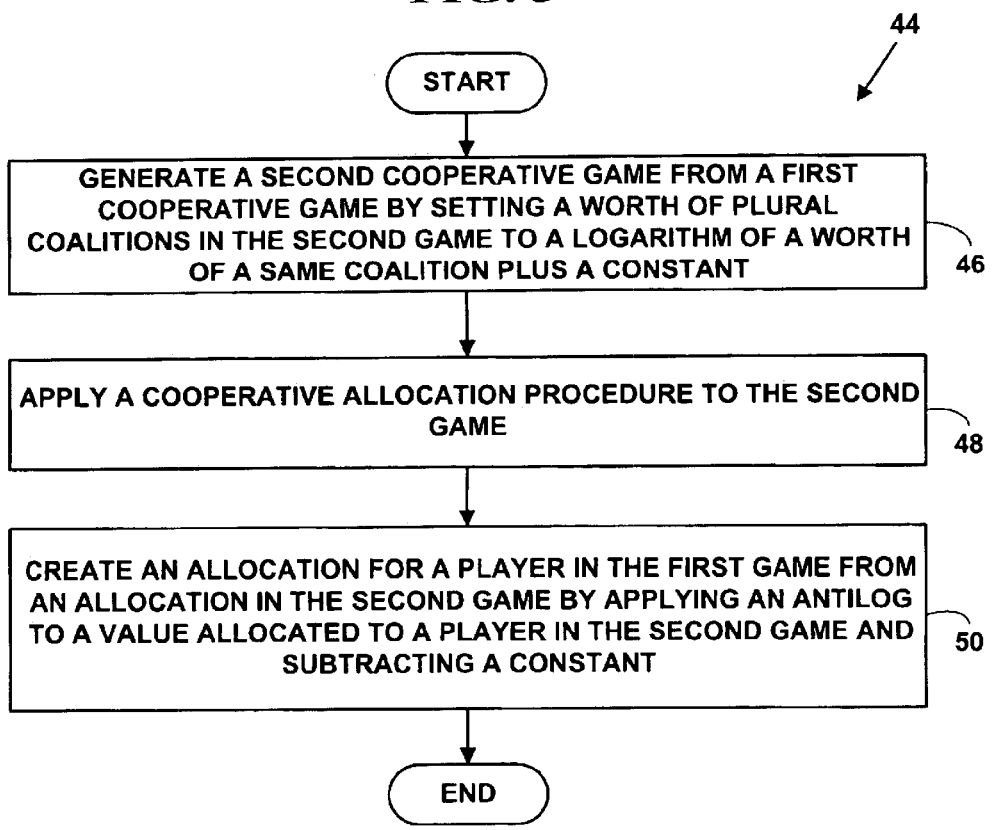
FIG. 5 is a flow diagram illustrating a method for allocating a worth of a coalition in a cooperative game on a multiplicative basis.

FIG. 5 is a flow diagram illustrating a Method 44 for allocating a worth of a coalition in a cooperative game on a multiplicative basis. At Step 46, a second cooperative game is generated from a first cooperative game by setting a worth of plural coalitions in the second game to a logarithm of a worth of a same coalition plus a constant. At Step 48, a cooperative allocation procedure is applied to the second game. At Step 50 an allocation for a player in the first game is created from an allocation in the second game by applying an antilog to a value allocated to a player in the second game and subtracting a constant.

Method 44 is illustrated with an exemplary embodiment of the present invention. However the present invention is not limited to such an embodiment and other embodiments can also be used to practice the invention. Method 44 is introduced in the context of cooperative resolution applications, but may have other applications in diverse areas of game theory, economics, finance, and engineering.

At Step 46, a second cooperative game is generated from a first cooperative game by setting a worth of plural coalitions in the second game to the logarithm of the worth of the same coalition plus a constant. If v is the first game and w the second game, then w(S)=log(c+v(S)), where c is a constant. In the most preferred embodiments the logarithm function used is the natural logarithm, although other logarithms may be used. In preferred embodiments the constant c will be set to one. This embodiment will be preferred when worths in a game are stated in terms of percentage changes. In other preferred embodiments c is set to zero. This embodiment will be preferred when worths in a game is stated in terms of ratios.

At Step 48, a cooperative allocation procedure is applied to the second game. Any allocation procedure may be used. In particular, either point or set allocation functions maybe used. In one preferred embodiment of the present invention, the Shapley value is used. However, other allocation procedures may also be used.

At Step 50, an allocation for a player in the first game is created from an allocation in the second game by applying an antilog to a value allocated to a player in the second game and subtracting a constant. For example, let the allocation to player i in the second game be $\phi^2_i(w)$. Then the allocation to player i in the first game is $\phi^1_i(v)$=antilog($\phi^2_i(v)$)−d. In the preferred embodiments of the present invention an exponential function is an antilog used and a constant d is equal to a constant c. However, other or equivalent antilog and constants can also be used.

The steps of Method 44 using the Shapley value for games with worths stated in percentage changes results in a formula for the value of a player i in a game v as is illustrated in Equation 23:

$$LL_i(v) = \exp\left(\sum_{S \ni i} \frac{(n-s)!(s-1)!}{n!} \ln\left(\frac{1+v(S)}{1+v(S \setminus i)}\right)\right) - 1, \tag{23}$$

where "exp" represents the exponential function, the summation is over all coalitions that contain player i, s is the number of players in the set S, and "ln" is the natural logarithm function. This will be referred to as the "log-linear value."

The log-linear value applied to the game of Table 1 yields the multiplicative value allocation of [0.131, 0.377, 0.171], in contrast to the Shapley value of the game, Sh(v)=[0.154, 0.452, 0.218].

Analysis of Effects in Categorical Models

Methods 20 and 36 may also be applied when a multivariate statistical model including categorical independent variables is used in the process of determining the worth of a coalition. The nature of interaction between categorical independent variables allows for additional types of analysis beyond those of models with purely continuous independent variables. Methods described in this section include techniques used in the field of analysis of variance. The principal difference is that classical analysis of variance seeks to determine which effects and interactions are statistically significant whereas the present invention seeks to decompose the variance.

The following notational framework will facilitate the exemplary description of methods to represent interactions among categorical independent variables. Modeling categorical effects as contemplated by the present invention is not limited to these methods and others may be used. In practice, categorical effects may be computed more efficiently using standard techniques known to those familiar with the statistical arts. Let P, Q, and R represent categorical independent variables, which will also be referred to as dimensions. For the purposes of description, each dimension is assumed to be composed of a set of mutually exclusive and collectively exhaustive categories. This means that, for every observation of data and every dimension, there is a single category that the data observation is assigned to. It is said to take on the value of that category. There may be categories such as "other," "none of the above," or "missing data." Thus, in practice, nonassignment to a category of a dimension may be turned into a default assignment.

The number of categories in dimension P is $n_P$. Let $C(P)$ be all the categories associated with any dimension P and let $\beta \in C(P)$ be a specific category of P. The notation $P_\beta$ refers to the set of all observations of data where the categorical independent variable P takes on value $\beta$.

Let S be an ordered set of dimensions, for example $S=(P, Q)$. Note that, here, S is a set of independent variables and not a coalition of players in a game. For the present, a one-to-one transferable access relationship is assumed such that any set of independent variables corresponds to a coalition with players that each have primary access to one of the independent variables.

Let $C(S)$ be the set of all combinations of categories of the individual dimensions. $A\beta=(\beta_1, \beta_2) \in C(S)$ is an s-tuple of categories, one corresponding to each dimension in S. Then $S_\beta$ refers to the set of all observations of data where categorical independent variable P takes on value $\beta_1$ and variable Q takes value $\beta_2$.

Let $\Omega$ represent the set of all dimensions. Then $C(\Omega)$ represents the "finest-grain" of categorization and an $\alpha \in C(\Omega)$ represents a complete selection of categories, one from every dimension. Let $n_{106}$ represent the number of such possible combinations. Let $\Omega_\alpha$ be a set containing all observations of data whose category assignments correspond to $\alpha$. For any $S \subset \Omega$ and every $\alpha \in C(\Omega)$ such that $\Omega_\alpha$ is nonempty there is exactly one $\beta \in C(S)$ such that all data observations in $\Omega_\alpha$ are also in $S_\beta$.

The preceding categorical framework is next applied to computing the effects associated with different dimensions. The methods described here are used to construct a design matrix X. Let $D(S)$ be a function that, for any dimensional set S, returns a matrix of t rows and c columns, where t is the number data observations and c is the number of category combinations in $C(S)$. Each row $r_i$ is associated with a category $\alpha(r_i) \in C(\Omega)$ and each column corresponds to a category $\beta \in C(S)$. Let $M=D(S)$ and let $M(i,j)$ be the value of the $i^{th}$ row of column j. Then $M(r_i,\beta)=$one if and only if $\Omega_{\alpha(ri)} \subseteq S_\beta$ and $M(r_i,\beta)=$zero otherwise. Also, let $D^{-\beta}(S)$ define a matrix of t rows and c-1 columns, identical to $D(S)$ except that the column corresponding to category $\beta$ is removed.

There are several ways to represent the categorical effects associated with a dimensional set S. In a preferred embodiment, an ordered collection consisting of S and the remaining individual dimensions is constructed. This approach will be referred to as a model of "Type I" categorical effects. Let this collection be $W=\{S, P, Q, R\}$, where it is understood that: (1) every dimension must either be included in S or appear as a singleton; and (2) no dimension can both be included in S and appear as a singleton or appear more than once as a singleton. Apply the function D to S, and apply $D^{-\beta}{}_P$ to the remaining dimensions, where, for each dimension P, $\beta_P$ is a category. The design matrix X results from the horizontal concatenation of the resulting matrices. Thus if $W=(S, P, Q, R)$, then X may be constructed as illustrated in Equation 24.

$$X=[D(S), D^{-\beta}{}_P(P), D^{-\beta}{}_Q(Q), D^{-\beta}{}_R(R)]. \quad (24)$$

For convenience, the matrix of the categories of the dimensional set under study will always be complete and the matrices associated with other dimensions or dimensional sets will be minus a category. The categories are left out so that the design matrix is not singular and effects may be determined by Equation 25 illustrated below. The deleted categories become default categories along the associated dimensions.

In another preferred embodiment of the present invention, no interactions are taken account of in the design matrix. This will be referred to as a model of "Type II" categorical effects. Here, $W=\{P, Q, R, \ldots\}$ contains all the dimensions as individual dimensional sets. The design matrix is then $X=[D(P), D^{-\beta}{}_Q(Q), D^{-\beta}{}_R(R), \ldots]$.

In another preferred embodiment of the present invention, the design matrix is based only on S. This will be referred to as a model of "Type III" categorical effects. Here, $W=\{S\}$, where S may represent a single dimension or multiple dimensions. The design matrix is then $X=D(S)$.

In another preferred embodiment of the present invention, the design matrix is based on a number of individual dimensions of S. This will be referred to as a model of "Type IV" categorical effects. Here, $W=\{P, Q, \ldots\}$. The design matrix is then $X=[D(P), D^{-\beta}{}_Q(Q), \ldots]$.

In another preferred embodiment of the present invention, the design matrix is based on two dimensional sets S and T that have no dimensions in common and together comprise all dimensions. This will be referred to as a model of "Type V" categorical effects. Here, $W=\{S, T\}$ and the design matrix is $X=[D(S), D^{-\beta}{}_T(T)]$.

In another preferred embodiment of the present invention, the design matrix is based on a partition of $\Omega$ that includes S. This will be referred to as a model of "Type VI" categorical effects. Here, $W=\{S, T, U, \ldots\}$ and the design matrix is $X=[D(S), D^{-\beta}{}_T(T), D^{-\beta}{}_U(U), \ldots]$.

The choice of type of effects depends on the understanding of the subject under study. Type I, Type III, Type V, and Type VI effects include interaction between the categorical dimensions that comprise S. Type II and Type IV models do not measure such interactions. Type III and Type IV methods do not include dimensions whose effects are not being measured in the design matrix. Thus all variations in a dependent variable are attributed to the dimensions of S. This will be appropriate under certain conditions. Type V effects models are similar to Type I models except that interaction is allowed among all the dimensions not included in S as well. In general, this will not be appropriate when studying explanatory power, but may be appropriate in studies of total effects. In Type VI models, an arbitrary pattern of interaction among the dimensions of $\Omega$ not included in S is allowed.

Once a design matrix is constructed, based on any type of categorical effects, dimensional effects may be computed as follows. Let Y be a vector of observations of a dependent variable to be analyzed, where Y has an observation for every $\alpha \in C(\Omega)$. Then dimensional effects may be computed by the standard least squares regression formula as illustrated in Equation 25, $$b = (X'X)^{-1} X'Y \qquad (25)$$

where b is a vector with coefficients for the estimated effects for all of the included categories of the dimensions of W. Identify an element of b with its category by using the category as a subscript.

The effect of a dimensional S set on any observation of a dependent variable $Y_i$ is the predicted value of $Y_i$ taking into account effects associated with the dimensions of S. This will be denoted $E_S(Y_i)$ and can be computed as follows. For Type I, Type III, Type V, and Type VI models, the effect is the coefficient of b corresponding to the set $S_\beta$. Then Equation 26 illustrates the determination of $E_S(Y_i)$:

$$E_S(Y_i) = b_\beta, \text{ where } Y_i \in S_\beta. \qquad (26)$$

For Type II and Type IV models, the effect is the sum of all coefficients corresponding to categories $P_\beta$ such that $Y_i \in P_\beta$ and $P \in S$. Then the determination of $E_S(Y_i)$ is illustrated in Equation 27:

$$E_S(Y_i) = \sum_{P \in S} (b_\beta, \text{ where } Y_i \in P_\beta). \qquad (27)$$

Before considering a determination of a worth for a coalition based on either measure of explanatory power, the possibility of specifying an access relationship more general than the one-to-one transferable relationship at Step 24 of Method 20 or the steps of Method 28 should be considered. Two restrictions on an access relationship typically are taken into account. In the treatment of models of categorical independent variables it is evident that the existence of interaction effects is a function the type of interaction model chosen. In consequence, the independent variables subject to the access relationship of Step 24 should not normally include interaction variables based on categorical independent variables. Further, Type I, Type V, and Type VI interaction models involve a partition of the independent categorical variables. In consequence, the access relationship should be such that the determination of the worth of any coalition of players does not result in the creation of a partition of the set of players such that the independent categorical variables or interaction variables accessible by any two coalitions overlap.

The determination of the worth of a coalition of players using total effects as a performance measure at Step 26 or Step 42 in a categorical effects model for a single observation k may then be made by selecting a type of interaction effect model and then setting v(S) as illustrated in Equation 28, $$v(S) = E_S(Y_k), \qquad (28)$$

where k either represents an actual observation or an observation to be forecast. Other methods of determining a worth by combining predicted values for sets of observations may also be used, including those described in the OLS examples illustrating Method 40.

The determination of a worth of a coalition of players using $R^2$ as a performance measure at Step 26 or Step 42 in a categorical effects model may be made by selecting a type of interaction effect model and calculating v(S) as is illustrated by Equation 29.

$$v(S) = 1 - \sum_{i=1}^{t} (E_S(Y_i) - Y_i)^2 \bigg/ \sum_{i=1}^{t} (Y_i - \overline{Y})^2, \qquad (29)$$

where $\overline{Y}$ is the average value of $Y_i$.

Equations 28 and 29 are exemplary methods for pure models of analysis of effects in categorical models. These models have many applications. One exemplary application is the analysis of survey data. For example, a poll may be conducted to see whether voters favor a referendum. Demographic information is also collected. Then $\Omega$ is the set of demographic dimensions, $C(\Omega)$ is the set of all $n_\Omega$ possible combinations of demographic attributes, and $Y_\alpha$ for an $\alpha \in C(\Omega)$ is the proportion of voters with characteristics $\alpha$ that favor the referendum. In this example, the Type III interaction model would generally be preferred. The preferred performance measure will generally be a measure of explanatory power rather than total effects.

Analysis of Changes in Proportions in Categorical Models

Methods 20 and 36 may also be applied when a multivariate statistical procedure using frequency data to compute marginal frequencies is used in the process of determining the worth of a coalition. This type of model is considered an analysis of changes in proportions model. This model is exemplary. Changes in proportions as contemplated under the present invention are not limited to this model and other models may be used. An analysis of changes in proportions also utilizes the categorical interaction framework described in the section "Analysis of Effects in Categorical Models," above. As in that section, assume, initially, the default one-to-one access relationship between independent variables and players in a game.

Let $Y^1$ and $Y^2$ be two dependent variables representing measures of the same quantity at two different time periods or under two different conditions. For example, these could be measures of sales or holdings of securities at two points in time. The observations of both $Y^1$ and $Y^2$ are associated with categorical independent variables that categorize relevant dimensions associated with the dependent variables. The analysis of changes in proportions reveals which dimensions are most important to understanding changes in the dependent variable and how much of that change is contributed by each dimension.

For any dimensional set S and category $\beta \in C(S)$, let $w^1$ be a set of weights such that $w^1(S_\beta)$ represents the percentage of the dependent variable $Y^1$ associated with observations $O_i$ such that $O_i \in S_\beta$. This relationship is illustrated in Equation 30:

$$w^1(S_\beta) = \sum_{i: O_i \in S_\beta} Y_i^1 \bigg/ \sum_{j=1}^{t} Y_j^1, \qquad (30)$$

where there are t observations of $Y^1$ and $Y^2$. Define $w^2(S_\beta)$ similarly.

The pure effects of changes from $Y^1$ to $Y^2$ along a number of dimensions S will be denoted by $w^S$ and may be determined by computing marginal weights with respect to the dimensions under study and then reweighting all fine-grain cell weights $w^1(\Omega_\alpha)$ for all $\Omega_\alpha \subseteq S_\beta$ by the ratio of the relevant $Y^1$ to $Y^2$ marginals. The weight associated with $\Omega_\alpha$ when taking into account changes along the dimensions of S is illustrated by Equation 31.

$$w^S(\Omega_\alpha) = w^1(\Omega_\alpha) w^2(S_\beta) / w^1(S_\beta), \qquad (31)$$

where $w^S$ is a function representing the weights resulting from inclusion of changes along the dimensions in S, $\Omega_\alpha \subseteq S_\beta$, and for $w^1(S_\beta)>0$. The value of $w^S$ for any collection of $\Omega_\alpha$, $C(\Omega_\alpha) \subseteq S_\beta$, is then the sum of $w^S(\Omega_\alpha)$ over all $\Omega_\alpha \in S_\beta$.

The case where $w^1(S_\beta)=0$ for some category $\beta \in C(S)$ requires special treatment. One effective approach is to use the proportions found in the complementary dimensional set. Let $T=\Omega \backslash S$ and let $\gamma \in C(T)$. For every $\alpha \in C(\Omega)$ there is one $\gamma \in C(T)$ such that $\Omega_\alpha \subseteq T_\gamma$. An appropriate weight for $\Omega_\alpha$ taking into account changes along the dimensions of S when $w^1(S_\beta)=0$ and $\Omega_\alpha \subseteq S_\beta$ is illustrated by Equation 32.

$$w^S(\Omega_\alpha)=w^2(S_\beta)w^1(T_\gamma). \tag{32}$$

Thus, the weight $w^2(S_\beta)$ is distributed in proportion to $Y^1$ weighting in the complementary dimensions. Because $S \cup T=\Omega$, $S \cap T=\emptyset$, $\Omega_\alpha \subseteq S_\beta$, and $\Omega_\alpha \subseteq T_\gamma$, it follows that $\Omega_\alpha = S_\beta \cap T_\gamma$. Therefore, the sum of $w^S(\Omega_\alpha)$ over all $\Omega_\alpha \subseteq S_\beta$ must equal $w^2(S_\beta)$.

The nature of an analysis of changes in proportions model is such that the categorical interaction models described in the section labeled "Analysis of Effects in Categorical Models" are not relevant. Interaction is always assumed among the dimensions of set of dimensions whose effect is to be evaluated. Also, only the dimensions to be evaluated enter into the calculation of effects (except when the initial weight on some category of S is zero, when a complementary set of dimensions may be used, as described above).

Analysis of total effects in a pure changes in proportions model may be done as follows. Select a subset of fine grain categories $G \subset C(\Omega)$. Let $S^*=A(S)$ be the dimensions accessible by any coalition S. Then a worth v(S) for any coalition S may be calculated as is illustrated in Equation 33:

$$v(S) = \sum_{\alpha \in G} (w^{S^*}(\Omega_\alpha) - w^1(\Omega_\alpha)). \tag{33}$$

Note G must be a proper subset of $C(\Omega)$ because if $G=C(\Omega)$, $v(S)=w^2(C(\Omega))-w^1(C(\Omega))$ for any coalition of players S. Often, G might be expected to be a single element of $C(\Omega)$. The game v represents the various contributions to $w^2(G)$ of the separate dimensions as modulated by the access relationship. The value of a player in this game will represent the contribution of the dimensions the player controls. The proportional value will not ordinarily be used for attribution in this type of game because it will be common to find that $v(S)<0$ for some coalitions S and the proportional value is not defined on such games. The Shapley value or log-linear values are the preferred values to be used in this case.

Consider an example of the application of Equation 33. Let $Y^1$ and $Y^2$ represent total new home sales in dollars in two successive years for a state or region. These data are categorized along the dimensions of city, price range, and style of home. Observations of $Y^1$ and $Y^2$ are available for every fine-grain combination of categories. Possible choices for G include a specific city, a price range, a style of home, a price range within a specific city or combination of cities, or a price range and home style within a single city. Assume a one-one transferable access relationship. The worth associated with any single dimension reflects the change in new home sales implied by average changes along that dimension, and similarly for any pair of dimensions. The worth associated with all three dimensions taken together is the actual change in new home sales for the homes included in G. A value of the game v then attributes total changes among geographic factors, demographic factors, and style preferences for the homes in the set identified by G.

Using pure analysis of changes in proportions in categorical models and explanatory power as a performance measure, Equation 34 illustrates a definition for the worth of a coalition S similar to the $R^2$ statistic, where, again, $S^*=A(S)$:

$$v(S) = 1 - \sum_{\alpha \in C(\Omega)} (w^2(\Omega_\alpha) - w^{S^*}(\Omega_\alpha))^2 / \sum_{\alpha \in C(\Omega)} (w^2(\Omega_\alpha) - \overline{w^2})^2, \tag{34}$$

where $\overline{w2}$ is the average value of $w_2$. In this case, the game v defined by Equation 34 will provide a representation of the joint contributions of the various dimensions to the total observed variance. In preferred embodiments, the proportional value of the dual of this game will be used to resolve these joint contributions. With reference to the preceding example, Equation 34 is based on the assumption that $G=C(\Omega)$. A value of a game v based on Equation 34 estimates the relative explanatory power of each dimension over all of the data. Should it be desired, Equation 34 could be altered to consider explanatory power over a subset of the data G by altering the sums to be for an $\alpha \in G \subset C(\Omega)$.

Variance Decomposition of a Variance-Covariance Matrix

Cooperative resolution methods may also be applied directly to a variance-covariance matrix. The matrix may itself be considered a statistical model showing how the variance of a composite entity is related to the variances and covariances of its components. Variance decomposition in this situation is a kind of risk attribution. Let X be a (t×n) matrix of n variables N={1,2, . . . , n} with associated (n×n) covariance matrix $\Sigma$, where $\Sigma_{ij}=\Sigma_{ji}$ is the covariance between variables i and j. These variables may represent diverse situations from the returns of individual assets in a portfolio to the failure probabilities of components in a mechanical system under different conditions. Let v be a game of n players where the worth of any coalition S associated with variables $S^*$ is their collective variance $1_S'\Sigma 1_S$, where $1_S$ is a (n×1) vector with $i^{th}$ value equal to one if $i \in S^*$ and zero otherwise: $v(S)=1_S'\Sigma 1_S$. The dual game w may again be defined as $w(S)=v(N)-v(N \backslash S)$. The variance attributable to any variable may then be determined by applying a value to one of these cooperative games.

Variance decomposition by use of the Shapley value has several desirable properties. The Shapley value of any variable i (in either game v or w) is the sum of all variances and covariances associated with i. Shapley value decompositions are "aggregation invariant." If two variables are combined that value assigned to the new combined variable will be the sum of the values of the original variables. Use of the Shapley value for variance attribution, however, also has the undesirable property that a variable can be assigned a negative share of the variance. This can happen when at least one of a variable's covariances with other variables is negative.

The preferred type of statistical cooperative game and value function depends greatly on the situation being analyzed. Preferred embodiments of the present invention may employ the Shapley value in situations where covariances are predominantly positive and aggregation invariance is considered an important property. Conversely, the proportional value may be preferred when there are significant negative covariances.

This type of variance decomposition may be applied in many circumstances. These include portfolio analysis, where the variables represent individual investments or classes of investments. Another application concerns decomposition of error variances in normal regressions or vector autoregressions (VARs) when the more general approach based on the method of the section "Determining the Worth of a Coalition in a Statistical Cooperative Game" are not desired. In both of the later cases, as is known in the art, there are standard methods for constructing a variance-covariance matrix associated with a predicted value.

Exemplary Applications

Preferred embodiments of the present invention are further illustrated with a number of specific examples. However, the present invention is not limited to these specific examples. The present invention can be used in a number of other situations in a number of other disciplines not related to these specific examples.

(a) Arbitrage Pricing Theory and Other Explicit Factor Models

The Arbitrage Pricing Theory (APT) of S. Ross ("The arbitrage theory of capital asset pricing," *Journal of Economic Theory*, v. 13, 1976, pp. 341–360) assumes that the returns of a financial security may be explained by a k-factor linear model. APT models are routinely used in the analysis and forecasting of economic and financial data. The k factors may be identified by a factor analysis method or they may be explicitly identified by an investigator. In the later case, the APT model is typically estimated with a regression procedure. One application of the present invention concerns the estimates of the percentages of variance accounted for by explicitly determined factors. As is known in the art, such variances are typically reported when a factor analytic method is used to identify factors, but are not currently reported when the factors are explicitly specified.

The present invention may be used to determine the percentages of variance explained by explicitly selected factors in a conventional APT model. In preferred embodiments used for this purpose the factors are the elements of the multivariate statistical model governed by an access relationship. In explicit models constructed with "mimicking portfolios," an intercept term and a one-to-one transferable access relationship is used in the preferred embodiments. Access is understood to allow use of the factors as independent variables in the construction of a submodel as described in the paragraph following the paragraph containing Equation 5. The $R^2$ of the resulting models is determined, for each S, $v(S)=R^2_S$, and a dual game is constructed. The proportional value of the dual game provides the estimate of the percentage of explanatory power contributed by a explicit factor. The intercept term may then be interpreted as a measure of "abnormal" performance analogous to "Jensen's alpha." The use of cooperative resolution thus enables an analyst to better compare explicit and derived factor APT models.

A further application to APT models involves the analysis of interaction terms. The k factors of an APT model are linearly independent, but they may still include interaction terms derived from a subset of "primitive" factors. In an APT model with interactions, it may be desirable to attribute the total effects of all interaction factors to the primitive factors. This may be done by specifying a total effects access relationship where the basic independent variables correspond to the primitive factors; the players of the cooperative game each have primary access to a primitive factor; a coalition has access to an interaction factor if and only if all players with primary access to a component of the interaction term are members of the coalition; and access allows use of the corresponding estimated coefficients from the full model. The worth of a coalition is then determined by Equation 7. The Shapley value of the resulting game will then provide a complete attribution of all factor effects to the primitive factors. This procedure computes the Aumann-Shapley prices of the primitive factors. The value of the game may be computed as described by Equations 12 and 13 or Equations 20 and 21.

The explained variance of a k-factor model with interaction factors may also be attributed to its primitive factors. In the preferred embodiments of the present invention the dual of this game is computed according to Equation 11 and the proportional value of the dual game is used to determine the explained variance of the primitive factors.

(b) Style Analysis

The returns-based style analysis method described by W. Sharpe in "Asset allocation: Management style and performance measurement," *Journal of Portfolio Management*, Winter 1992, pp. 7–19, is an example of a related model. The methods described above may also be applied to style analysis models. Style analysis may be used to estimate the composition of a mutual fund. Sharpe's method of performing style analysis is to regress returns of a mutual fund on a set of benchmarks representing different asset classes. In this regression the coefficients are constrained to be non-negative and to add up to one. As is known in the art, this type of regression may be estimated using quadratic programming techniques.

The interpretation of the regression coefficients in a Sharpe style analysis is that they represent the weights on passive index-type funds associated with the different equity classes that best approximate the returns process of the mutual fund. The present invention may be used to determine the percentage of returns variability associated with the different asset classes.

A statistical cooperative game may be constructed from the $R^2$ coefficients of the Sharpe style model maintaining the constraints that regression coefficients must be non-negative and sum to one; or one or both of these constraints may be removed. In one preferred embodiment of this invention both the nonnegativity and the summation constraint are removed and variance decomposition is presented as a way of interpreting the resulting coefficients. It is also possible to remove only the nonnegativity constraint and set the worth of coalitions with negative $R^2$ (due to the summation constraint) equal to zero. The proportional value of the dual game is the preferred allocation procedure for variance decomposition of style analysis models.

A style or factor model may be used to construct a passive or idealized model of a financial security as a mixture of benchmarks or mimicking portfolios, as is known to those familiar with the art. Variance decomposition may also be performed on this passive model and the results compared with the variance decomposition of the security itself. This type of comparison can be helpful in understanding the volatility of the financial instrument relative to its benchmarks. Let b be a vector representing the results of a variance decomposition of the passive model of the financial instrument. Let f be a vector representing the results of a variance decomposition on a financial instrument using a set of n benchmarks, and let f* be the normalization of the decomposition such that all components sum to 100%. This normalization may be used so that the variance decomposition of the financial instrument will be properly comparable to the passive model's decomposition. Other approaches are possible. With this approach, when the same benchmarks used to build the passive model are used in the decomposition, the explained variance will be 100%. Then, for each benchmark i, the ratio of the variance share of the financial security compared to the passive benchmark may be constructed. This variance ratio is illustrated in Equation 35.

$$\text{Variance Ratio}_i = \frac{f_i^*}{b_i} \quad (35)$$

Variance ratios greater than one indicate that the financial instrument variance associated with a particular benchmark is greater than the variance associated with that benchmark in the passive model. This condition is analogous to a regression coefficient or "β" greater than one in a factor model. For some purposes it may be desirable to subtract one from this ratio to obtain an excess variance ratio. In preferred embodiments of the present invention, the proportional value of a statistical cooperative game will be used to effect the variance decomposition. However, the use of any variance decomposition method is claimed as within the scope of the present invention.

The APT, style analysis, and variance ratio procedures described here may be easily utilized in a "rolling window" framework where results are estimated for a number of periods of time based on temporal subsets of the data. Such techniques are well known to those familiar with this art. Additionally, techniques such as (exponentially) weighted or flexible least squares may be used to focus the estimation procedure on a particular point in time.

(c) Manager Performance Attribution

One object of the present invention is to improve the methods by which the performance of managers is analyzed. This is an extension of methods commonly used to analyze the performance of money managers, individuals responsible for investing money, however, they may be applied to many other management contexts. These methods are an extension to the accounting approach to performance attribution first developed by G. P. Brinson and N. Fachler in "Measuring non-U.S. equity portfolio performance," *Journal of Portfolio Management*, Spring 1985, pp. 73–76, incorporated herein by reference, and subsequently developed by many others. These procedures, in general, produce interaction terms which complicate results and may make them more difficult to interpret.

In Brinson and Fachler (1985) the performance of a portfolio or fund manager is over a period of time is compared to a benchmark. Performance is broken down into "timing" and "selection" effects across at least one dimension, and, in some cases two dimensions of interest. Timing refers to the ability to shift investment to "categories" of the economy that will perform better, as reflected in the performance of the associated benchmark, in the subsequent period. Selection refers to the ability to identify a weighting of securities within a category that will do better than the benchmark weighting of securities in that same category in the subsequent period. Typical dimensions in these procedures are choice of industrial sector or country, although other dimensions are possible. These techniques are typically applied to one, or, at most, two dimensions of interest. It is straightforward to adapt techniques already described in this application in order to resolve these statistical joint effects. It is, however, possible to combine the methods of analysis of effects in categorical models and analysis of proportions in categorical models, described above, to enable manager performance attribution across an arbitrary number of dimensions.

Assume that every security in a manager's portfolio is classified along the all dimensions of a dimensional set $\Omega$. Let $w^B(S_\beta)$ be the benchmark weight of all securities in any $S_\beta \subseteq C(S)$ with $S \subseteq \Omega$. Define $w^M(S_\beta)$ to be the manager's weight on securities in $S_\beta$. Weights are based on market capitalization. Similarly, define $r^B(S_\beta)$ and $r^M(S_\beta)$ to be the benchmark and manager returns associated with these securities. The return on a security of set of securities is the percentage change in their value over the period in question. A benchmark is a standard of comparison. Common benchmarks include indices such as the Standard and Poor's 500 and the Russell 2000. Other benchmarks may be chosen. In particular, a benchmark may be the manager's holdings in the previous time period.

In order to construct a cooperative game to represent contributions of timing and selection among the various dimensions, it is possible to determine a return due to a combination of selection and timing dimensions. Timing skill relates to changes in proportions and may be analyzed by the methods for analyzing changes in proportions, described above. Selection skill is better analyzed by the methods of analysis of categorical interaction, previously described here. Let S be the set of dimensions associated with selection skill and T be the set of dimensions associated with timing skill. An incremental return due to selection in the dimensions of S and timing in the dimensions of T can then be calculated as is illustrated in Equation 36:

$$\Delta^{S,T} = \sum_{\alpha \in C(\Omega)} (w^T(\Omega_\alpha)r^S(\Omega_\alpha) - w^B(\Omega_\alpha)r^B(\Omega_\alpha)), \quad (36)$$

where $w^B$ and $r^B$ are the benchmark weights and returns, respectively, $w^T$ is the manager's weight when timing is limited to the dimensions of T, and $r^S$ is the manager's return when skills are limited to the dimensions of S. Equations 31 and 32 may be used to determine $w^T(\Omega_\alpha)$, with $w^B = w^1$ and $w^T = w^2$. In the preferred embodiment of this method, return $r^S(\Omega_\alpha)$ is estimated using a Type I interaction model and is then found as the element of b from Equation 25 corresponding to $\Omega_\alpha$, as defined in Equation 26.

In order to use this model in Method 28, the relation between selection and timing dimensions and the players of the game are specified. The manager performance attribution model is a fusion of two separate models, one analyzing selection and the other timing. Thus, the same independent categorical variable may appear in two different contexts. The access relationship is understood to cover the categorical independent variables of both models. Let SA(S) be the selection independent variables accessible by a coalition S and let TA(S) be the timing independent variables accessible by S.

When total effect is the performance measure, the preferred embodiment of the present invention defines the worth of a coalition S to be as illustrated in Equation 37:

$$v(S) = \Delta^{SA(S), TA(S)}. \quad (37)$$

When v is defined by Equation 37 the Shapley or log-linear values may be used to allocate the worth of v to individual players in the preferred embodiments of this invention. The proportional value and the powerpoint are not appropriate because it should be expected that v(S)<0 for many coalitions. Controlled allocation games, described below, provide an alternative approach for determining total effects.

A-preferred method of defining a measure of explanatory power for manager performance is to calculate an $R^2$ type of measure in the following way. First calculate the total sum of squares for the variations in manager performance as illustrated in Equation 38:

$$SST = \sum_{\alpha \in C(\Omega)} (w^M(\Omega_\alpha)r^M(\Omega_\alpha) - \overline{w}^M \overline{r}^M)^2, \quad (38)$$

where $\overline{w}^M$ and $\overline{r}^M$ are average manager weights and returns. Then, for a coalition S, calculate the sum of squared error resulting from the selection and timing dimensions accessible by S as illustrated in Equation 39:

$$SSE(S) = \sum_{\alpha \in C(\Omega)} (w^{TIV(S)}(\Omega_\alpha) r^{SIV(S)}(\Omega_\alpha) - w^M(\Omega_\alpha) r^M(\Omega_\alpha))^2. \quad (39)$$

Finally, set the worth of S as illustrated in Equation 40:

$$v(S) = 1 - SSE(S)/SST. \quad (40)$$

In preferred embodiments, the proportional value of the dual of the game defined by Equation 40 will be used to resolve joint effects in the attribution of explanatory power. It is possible that v(S)<0 for some S. These occurrences should be infrequent and inconsequential. The proportional value may still be used by setting v(S)=ϵ>0 for these coalitions.

Equation 37 can be used to define an allocation game in a controlled allocation game, see below, and Equation 40 can be used to define the control game. The integrated proportional control value can then be used to determine manager performance attributions.

Controlled Allocation Games

Some applications of the present invention involve allocations in games where the worth of a coalition may be zero or negative. A proportional value typically cannot be computed under these circumstances. If the zero and negative worths are a small number and small in magnitude in comparison to positive values, it may be reasonable to set zero and negative worths to a small positive number and then use a proportional value. This step will be reasonable when these exceptional worths do not contain important information relevant to the allocation process, but result, instead from incidental computational or statistical effects. In other circumstances, zero and negative coalitional worths may convey essential information. For example in the manager performance attribution model described above, negative worths are associated with poor managerial performance along a particular set of dimensions.

It may at times be desirable to incorporate proportional effects into allocations in games with consequential non-positive coalitional worths. This is an example of a broader class of situations that will be called "controlled allocation games." A controlled allocation game is an arrangement, based on two cooperative games, where coalitional worths of the first game influence value allocation in the second game. The first game is called the "control game" and the second game is the "allocation game." Controlled allocation games allow the bargaining power of coalitions in one cooperative game to influence allocations in a second cooperative game.

Statistical cooperative games fit well into the controlled allocation game framework because separate games based on explanatory power and total effects can be associated with the same statistical model. In particular, the present invention illustrates how to introduce proportional bargaining power effects generated from a positive control game based on explanatory power into an allocation game based on total effects. Controlled allocation games may find other applications besides those associated with statistical cooperative games and the present invention is not limited to those described.

Figure 6:
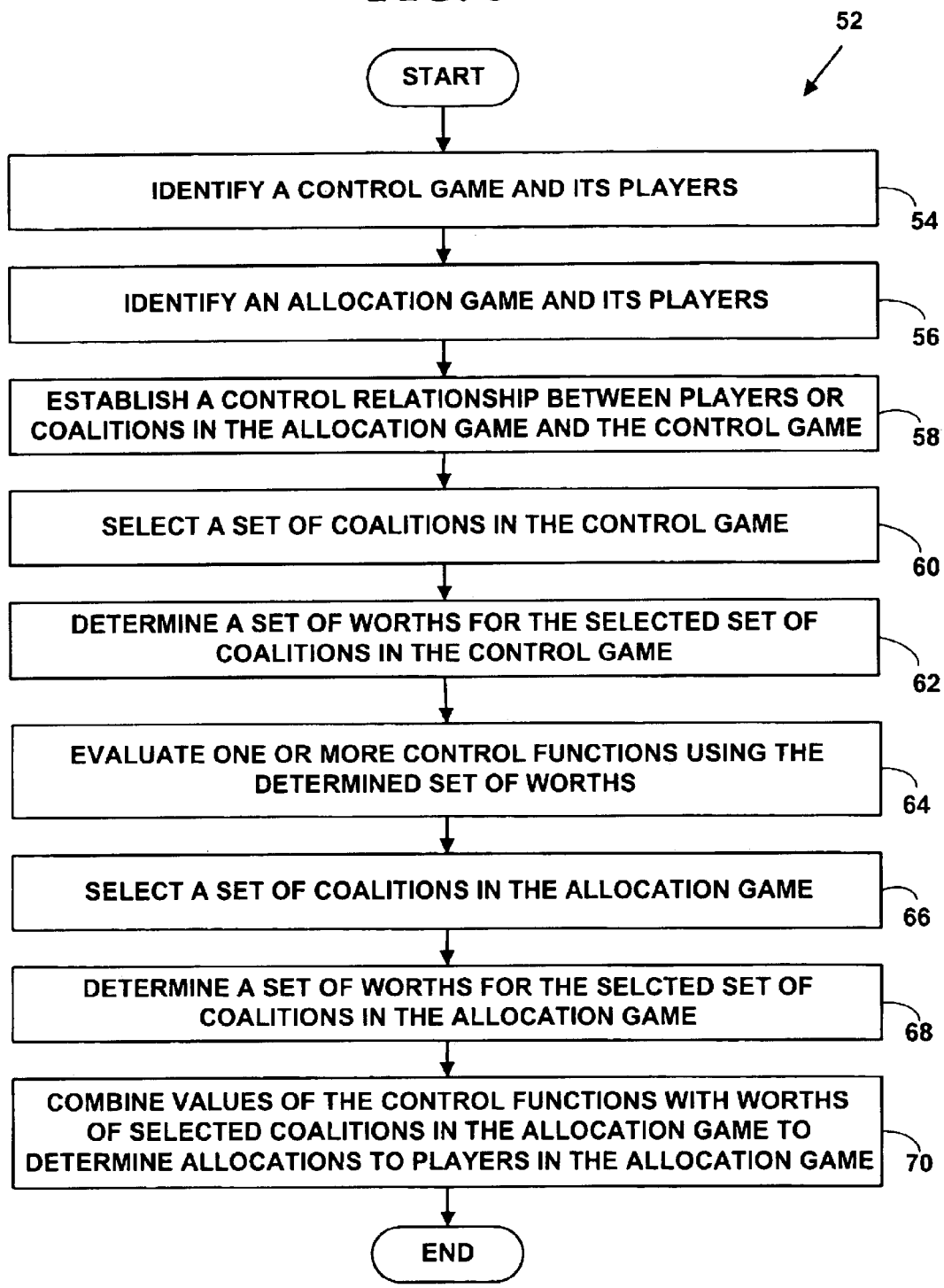
FIG. 6 is a flow diagram illustrating a method for constructing a controlled allocation game.

FIG. 6 is a flow diagram that illustrates a Method 52 for allocating value among players in a cooperative allocation game in order to resolve joint effects in a allocation problem. At Step 54, a control game and its players are identified. At Step 56, an allocation game and its players are identified. At step 58, a control relationship between players or coalitions in the control game and players or coalitions in the allocation game is established. At Step 60, a set of coalitions in the control game is selected. At step 62, a set of worths of the selected set of coalitions in the control game are determined. At Step 64, one or more control functions using the determined set of worths of coalitions in the control game are evaluated to determine a set of values for the control functions. At Step 66, a set of coalitions in the allocation game is selected. At Step 68, a set of worths for the selected set of coalitions in the allocation game are determined. At Step 70, the set of values for the one or more control functions evaluated are combined with the determined set of worths for the selected set of coalitions in the allocation game to determine allocations to players in the allocation game.

Method 52 may be applied to virtually any cooperative game. In preferred embodiments of the present invention, the Method 52 is computer-based method and is embodied in a computer program. An allocation problem in the form of such a cooperative game, including the set of players N, is assumed to be to already identified to the program. This identification may be a direct result of instructions in the program or may result from the choice of a user of the program. Allocation games utilizing this method may involve resolution of joint effects of a statistical nature, and also those involving risk, cost, or benefit allocation.

In such an embodiment, at Step 54, a control game and its players are identified. At Step 56, an allocation game and its players are identified. These identifications may be a direct result of instructions in the computer program or may result from the choice of a program user from a number of options. Let w represent the control game. Typically, the set of players will be the same in both the control game and the allocation game v. This, however, need not be the case. The control game may have the same or different players as the allocation game. There may be greater or fewer players in the control game than in the allocation game. In one embodiment of the present invention, the allocation game is a statistical cooperative game based on total effects and the control game based on explanatory power and utilizes the same set of players, multivariate statistical model, and access relationships. However, the present invention, is not limited to this embodiment and other types of allocation and control games can also be used to practice the invention.

Typically the control game will be different from the allocation game. It is, however, possible that an allocation game might serve as its own control game. These cooperative games may be stored in the database 16 in memory or in files that may be accessed by the processing system 10. These files may be text files, or files in a format for a particular database or spreadsheet program. These cooperative games may be accessible through a network or internet connection 18.

These cooperative games may exist as a list that enumerates the worths of various coalitions. One technique for constructing such a list when a worth is provided for all coalitions is to let the position in the list correspond to the binary representation of the coalition. For example, position 13 would then correspond to coalition {4, 3, 1} because 13 has the binary representation "1101." A cooperative game may also be stored as a list of pairs, where the first element is a binary representation of the coalition and the second element is the worth of the coalition. A cooperative game represented in other ways. For example, the worth of a coalition may be the solution of a mathematical problem.

At Step 58, a control relationship between players or coalitions in the control game w and the allocation game v is established. A "control relationship" is a mapping from players or coalitions in the control game to players or coalitions in the allocation game. The control relationship may result directly from instructions in the computer program or may result from user choice from a number of options. Typically, in games with the same set of players, this control relationship will be an identity relationship for each player in the control game to the same player in the allocation game. This also implies that any coalition S in the control game corresponds to same coalition S in the allocation game. In this case it could be said that the power of a player or coalition in the allocation game is based on its power in the control game, where power is used as a general term for the effect of this control.

A control relationship may also be a mapping from coalitions in the control game to coalitions in the allocation game. The control game may have additional players not present in the allocation game and then it will be common for the immediately previously described relationships to hold for all players in the control game that are also in the allocation game. In control games with fewer players than the allocation game a player in the control game may correspond to a class of players in the allocation game. Many other types of control relationships are possible and the present invention is not limited to those decribed.

At Step 60, a set of coalitions in the control game is selected. This set may comprise all possible coalitions or only a subset of them. This selection may be determined directly by instructions in the program or may result from user choice from a number of options. Coalitions may be selected by size or generated by a subset of players. Coalitions may be randomly selected. Coalitions may be generated from randomly selected permutation orderings of players. Selected coalitions are mapped by the established control relationship to coalitions in the allocation game.

At Step 62, a set of worths of selected coalitions in the control game are determined. Worths in the control game may be determined by the program by reference to memory locations or files. Alternatively, worths in the control game may be computed based on an externally or internally supplied formula.

At Step 64, one or more control functions using the determined set of worths are evaluated. The one or more control functions may be a value function or other function generating an allocation of the control game. Examples of such functions include the Shapley and proportional values. The choice of the one or more control function selection may be determined directly by instructions in the program or may result from user choice from a number of options. The computer program evaluates the control functions. Values for all players in the control game need not be computed under some circumstances.

Alternatively, a control function may determine other properties of the control game that are inputs to determining value allocation in the allocation game. An example of such a control function is an ordered worth product (see Equation 43, below) for a set of coalitions generated from an ordering of players.

At Step 66, a set of coalitions in the allocation game is selected. If the control game v and allocation game w have the same set of players, the same coalitions may be selected. This selection may be determined directly by instructions in the program or may result from user choice from a number of options. Alternately, a different set of coalitions may be selected. Coalitions in the allocation game may alternatively be selected in the same manner as for the control game and described in Step 58. Coalitions may also be selected by other means.

At Step 68, a set of worths for the selected set of coalitions in the allocation game is determined. At Step 70, the determined set of values for the one or more control functions in the control game are combined with the determined set of worths for the selected set of coalitions in the allocation game to determine allocations to players in the allocation game. The way this combination is effected may be determined directly by instructions in the program or may result from user choice from a number of options.

One example of combining values of control functions in the control game with worths of selected coalitions in the allocation game is when the control function is a value function such as the Shapley or proportional value and a player's value in the control game w is used as the weight of a player in the allocation game v. This weight is then used by a weighted value such as the weighted Shapley value (illustrated in Equation 17) as a value function to determine allocations to players in the allocation game. This embodiment is illustrated in Equations 41 and 42 using a proportional value to determine values in the control game w.

$$\omega = Pr(w) \quad (41)$$

$$x = wSh(v, \omega) \quad (42)$$

In Equations 41 and 42 $\omega$ is a vector of weights for each player, v is the control game, and x is the resulting vector of allocations to players. In this example, the players in the control and allocation games are the same, all coalitions are selected as the worths of all coalitions are necessary to calculate the proportional value, and the control function is the proportional value.

Many variations on this example are possible and the invention is not limited to this embodiment. Many different allocation functions may be substituted for the proportional value in Equation 41. Transformations of allocations $\omega$ may be used as weights in Equation 42. Other weighted value functions know to those familiar with the art may be used in place of the weighted Shapley value, for example the weighted proportional value, or NTU versions of these values.

One preferred embodiment of the present invention called the "integrated proportional control" game is based on the representation of the proportional value as a weighted sum of marginal contributions. B. Feldman, "A dual model of cooperative value," 2002, Lemma 2.9 shows that the proportional value has a representation as a weighted sum of marginal contributions over all possible player orderings. The weight for each ordering in this sum is based on the ordered worth product for that ordering. Let r be an ordering of players and let $S_m^r$ be the coalition formed by the first m players in the ordering r. Then a formula for calculating an Ordered Worth Product ("OWP") for ordering r in an allocation game v is illustrated in Equation 43:

$$OWP(v, r) = \prod_{m=1}^{n} v(S_m^r), \quad (43)$$

where product operator $\Pi$ indicates the product of the coalitional worths $V(S_m^r)$ as m increments from one to n.

A proportional value of a player i according to this weighted marginal contribution representation may then be illustrated by Equation 44:

$$PV_i(v) = R(N, w) \sum_{r \in R^\Omega(N)} OWP(v, r)^{-1} (v(S_{r(i)}^r) - v(S_{r(i)}^r \setminus i)), \quad (44)$$

where R(N, w) is a proportional or ratio potential of a grand coalition in control game w, $R^{\Omega}(N)$ is a set of all orderings of the players in N, and $S_{r(i)}^r$ is a coalition formed by player i and all players before player i in the ordering r. R(N, v) may be calculated according to Equation 14, however, in practice, this calculation is not necessary as this quantity can be inferred if values for all players are to be calculated. In Equation 44, the sum operator $\Sigma$ indicates a sum over all orderings of the players of N. Finally, the difference ($v(S_{r(i)}^r) - v(S_{r(i)}^r \setminus i)$) is the marginal contribution of player i in the ordering r. The marginal contribution of player i is the worth of the coalition that contains player i and all players before it, minus the worth of the coalition that contains only all the players before player i. The inverse (i.e., -1) of the ordered worth product for the ordering r is the relative weight applied to a player's marginal contribution in that ordering. The sum over all orderings is a player's relative proportional value. A player's actual proportional value is this relative value times the ratio potential of the grand coalition.

This representation of the proportional value is easily adapted to the controlled allocation game framework described by Method 52. Assume for simplicity that control and allocation games have the same set of players and a default identity control relationship is used. Select all coalitions in both the control and allocation games in Steps 60 and 66. Use ordered worth products of player orderings in the control game as the control functions in Step 64, and determine their values. Also, the potential of the grand coalition may also be considered a control function and may be calculated. Combining the control functions with the worths of selected coalitions in Step 70 to compute the integrated proportional control value for a player may be done by computing the sum over all orderings of the product of the ratio potential of the grand coalition, the inverse of the ordered worth product for ordering r in the control game w, and the marginal contribution of the player in the ordering r in the allocation game v. The computation of the integrated proportional control value for a player i is illustrated by Equation 45.

$$IPC_i(v, w) = R(N, w) \sum_{r \in R^{\Omega}(N)} OWP(w, r)^{-1} (v(S_{r(i)}^r) - v(S_{r(i)}^r \setminus i)),  \quad (45)$$

where, R(N, w) is a ratio potential of a grand coalition for control game w, $R^{\Omega}(N)$ is the set of all permutations of orderings of the players in N, $S_{r(i)}^r$ is the coalition formed by player i and all players before player i in the ordering r, and $v(S_{r(i)}^r)$ is a worth of the coalition. Note that R(N, w) is effectively a normalizing factor. R(N, w) can solved for by noting that the sum of all player values must equal v(N). The difference between Equations 44 and 45 is that the ratio potential of the grand coalition and all ordered worth products are based on the control game w.

There are other representations of the proportional value as a weighted sum of marginal contributions and the present invention is not limited to those described. See, for example, B. Feldman, "A dual model of cooperative value," 2002, Corollary 2.1. Such representations may similarly be adapted to represent the integrated proportional control value as a sum involving weights determined in a control game and marginal contributions determined in an allocation game.

In one preferred embodiment of the present invention, the control game is a statistical cooperative game using explanatory power as a performance measure; the allocation game is a statistical cooperative game using total effects as performance measure; the control function is the proportional value; and the combination of the control function and worths of the allocation game is effected by use of the weighted Shapley value or another weighted value. The weight assigned to a player and used in the calculation of the weighted value in the allocation game is that players' proportional value in the control game.

Many variations on Method 52 are possible. One variation is described in the section "Approximation Games," below.

Approximation Games

The number of computational steps needed to compute cooperative game value functions such as the Shapley and proportional values increases quickly with the number of players in a game. A game with n players has $2^n - 1$ coalitions. Computing values by means of potential functions such as exemplified in Equations 12 and 14 requires at least $2^n - 1$ evaluations of these potential functions. Computing an exact value for a game with 40 players may then involve determining more than a trillion coalitional worths and executing more than a trillion functional evaluations. Approximation methods can greatly reduce the computational resources required to estimate a value function when exact results are not necessary. The following methods allow computation of approximate values. These methods are useful not only for large statistical cooperative games, but also for large (but finite) cooperative games generally.

FIG. 7 is a flow diagram illustrating a Method 72 for approximating a value function for players in a cooperative game v based on a large number of players n and representing an allocation problem. At Step 74, a measure of precision is selected. At Step 76, a desired precision for estimated player values is determined. At Step 78, a collection of orderings from a set of possible permutations of player orderings is selected. At Step 80, at least one intermediate value function of coalitional worths generated for each selected ordering is computed. At Step 82, a precision of approximations of values for players is periodically computed to determine if more player orderings should be generated to obtain a more precise estimate of values for players. At Step 84, a value approximation for determining allocations to players is computed when a desired degree of precision is reached or a selected computational limit is exceeded.

Method 72 is an illustrative embodiment. However, the present invention is not limited to such an embodiment and other embodiments can also be used to practice the invention.

In such an embodiment at Step 74, a measure of precision is selected. A standard error of the value approximation is a typical measure of precision. In some cases other or additional measures may be selected. Mean absolute deviation is an example of an alternative measure of precision. Mean absolute deviation is less sensitive to the effect of realizations that are far from the mean. Kurtosis is an example of an additional measure of precision that may be useful in assessing the quality of an approximation. The measure of precision may be determined by the procedure embodying this method or be selected by the user of the procedure.

At Step 76, a desired precision for approximated player values is determined. This precision may be determined by the procedure embodying this procedure or may be selected by the user of the procedure. The desired level of precision may be for a particular player, the minimum over all players whose value is to be approximated, or for some other criterion such as an average standard error of all values to be approximated.

At Step 78, a collection of orderings from a set of possible permutations of player orderings is selected. The first time Step 78 is executed $t_0$ orderings are selected. The initial number of orderings may be a function of the measure of precision and the desired level of precision. It may also be a function of other factors such as the number of players in the game.

An "ordering" of the players is a list of the players giving each player a unique position in the ordering. Two orderings are the same when every player has the same position in each ordering. There are n! possible orderings of the players. A set of all orderings of a coalition N is represented as $R^\Omega(N)$. A game of 15 players generates more than a trillion unique orderings. In large games, $t_0$ will be much smaller then n!.

In one of the preferred embodiments of this invention, orderings are generated with the use of a random number generator. Methods for random number generation are well known to those familiar with the art. A player i may have an equal likelihood of appearing any position in such an ordering, or some positions may be more likely than others. In particular, in calculating the weighted Shapley value, the probability of a player i appearing at any point in an ordering may be calculated as the ratio of its weight to the sum of the weights of all unordered players. As described below, stratified sampling of orderings may sometimes be desirable, with some subsets of the set of all orderings $R^\Omega(N)$ more likely than others.

Alternatively, a list of orderings may be predetermined or may be described in mathematical form. Orderings may be selected from this list, either randomly or by a deterministic rule.

Let $R^*(N)$ be the collection of orderings used in the approximation process and assume the sampling process is not stratified. Thus $R^*(N) \subseteq R^\Omega(N)$. If Step 78 is executed only once then $R^*(N)$ will contain $t_0$ orderings. Every time Step 78 is executed in the approximation process more orderings are added to $R^*(N)$.

At Step 80, at least one intermediate value function of coalitional worths generated by each selected ordering in $R^*(N)$ is computed. The set of coalitions generated by an ordering r of the n players is the coalitions $S_i^r$, where i varies from 1 to n, composed of the first i players of the ordering r. Intermediate value functions are used in the approximation process. For example, in the case of computing an approximation of the Shapley value, the marginal contribution of at least one player with respect to a selected ordering is calculated. The computed values of the intermediate value functions may be stored in memory or calculations based on these values may be stored. Storing the actual computed values may use considerable memory in games with many players. It may thus be preferable to instead save in memory only the sum or other aggregate functions of these intermediate value functions.

Additionally, any functions required for the computation of precision statistics may also be computed at Step 80. For example, in computing a standard error for a value approximation a squared value of an intermediate value function may be calculated.

At Step 82, a precision of approximations of values for players is periodically computed to determine if more player orderings should be generated to obtain a more precise estimate of values for players. If the precision is equal or greater than the desired precision, Step 84 is executed immediately.

If the precision is less than the desired precision other considerations may still lead to passing from Step 82 to Step 84. For example, there may be a limit such that, if the desired precision is not reached after a certain number of orderings have been evaluated, after using a certain amount of computer time, or some other measure of cost is exceeded; execution passes to Step 84 although the desired precision has not been achieved.

If the precision is less than the desired precision and no iteration limit has been exceeded Steps 78 and 80 may be executed again in a loop and the precision again determined at Step 82. This loop may be repeated until the desired precision is reached or an iteration limit is exceeded.

The number of additional orderings generated each time Step 80 is executed may vary in the process. The number of additional orderings may be conditioned on factors such as the difference between the estimated and desired precision. For example, if increasing precision corresponds to a lower value of the precision statistic and precision is approximately inversely proportional to the square root of the total number of orderings evaluated t, then an estimate of the required number of additional orderings $t_A$ to be evaluated is illustrated by Equation 46

$$t_A = t\left(\left(\frac{p_M}{p_D}\right)^2 - 1\right), \quad (46)$$

where $p_M$ is the measured precision and $p_D$ is the desired precision. If $t_A$ exceeds an iteration limit the number of additional orderings selected may be reduced or execution can pass to Step 84.

At Step 84, allocations to players in the cooperative game are determined based on the intermediate value functions generated for each ordering. Final precision statistics may also be calculated. In this step the computed values of the intermediate value functions, or aggregate functions based on the intermediate value functions, are used to approximate the value function of the game. When approximating the Shapley and weighted Shapley values an average of the intermediate value functions may be calculated. The Shapley value for a player may be estimated as the average marginal contribution over all selected player orderings.

An approximation for the Shapley value for a large game may be computed using Method 72 as follows. Select standard error as the precision statistic and select a desired precision at Steps 74 and 76. At Step 78, determine the initial number of random orderings to be generated and generate the random orderings. Random orderings may by using a permutation algorithm. One such algorithm is to generate a uniformly distributed random number for each player and order (i.e. sort) the players according to these random values. Methods of sorting are well known to those familiar with the art. At Step 80, for each such ordering r, calculate a marginal contribution $M_i^r(v)$ of each player i in game v whose value is to be estimated. The calculation of the marginal contribution of a player i according to a player ordering is illustrated in Equation 47

$$M_i^r(v) = v(S_{r(i)}) - v(S_{r(i)-1}), \quad (47)$$

where v refers to the specific cooperative game, $S_{r(i)}$ is the coalition containing the player i and all the players before i in the ordering r, and $S_{r(i)-1}$ is the coalition of players coming before i in the ordering r. These intermediate value functions, the marginal contributions $M_i^r(v)$, may be stored separately in memory or may be summed for each player, so that only the sum need be stored in memory. Also at Step 80 calculate the squared value of calculated marginal contributions $M_i^r(v)$ and store these values or their sum.

At Step 82, calculate the standard error of the approximation. For the Shapley value of a player i, this is the standard error of the mean, which may be calculated according to the formula illustrated by Equation 48.

$$Std\ Err = \frac{\hat{\sigma}_{M_i^r(v)}}{\sqrt{t}} = \frac{1}{\sqrt{t}}\sqrt{\frac{1}{t-1}\sum_{r \in R^*(N)} M_i^r(v)^2 - n\overline{M_i^r(v)}^2} \quad (48)$$

If the precision is less than the desired precision, i.e., if the standard error is greater than the desired standard error, and the iteration limit has not been reached then Steps 78 and 80 are executed again.

At Step 84, an average marginal contribution for each selected player i, $\overline{M_{i^r(v)}}$ is computed. This is an unbiased estimate of the Shapley value.

To compute an approximation of the weighted Shapley value using Method 72, the procedure for calculating the Shapley value may be modified by using a weighted random ordering procedure at Step 78 such that each ordering r is consistent with weights w. An example of an iterative algorithm to generate such a random ordering is to divide the unit interval into contiguous segments that are assigned to each unordered player. Initially all players are unordered. The length of the interval assigned to each unordered player is proportional to its relative weight. Then a random number uniformly distributed between 0 and 1 is generated.

The player associated with the interval that contains the random number is selected as next in the ordering. The algorithm is repeated until only a single player is left, this player is last in the ordering. The expected value of the average marginal contributions of a player i resulting from this modification of Step 78 re equal i's weighted Shapley value with weights w.

A powerpoint of a game v (illustrated in Equation 18) may be approximated by the following procedure. First approximate the Shapley value of v. Then approximate the weighted Shapley value using, as weights, players' Shapley values. Next use players weighted Shapley values as weights in another approximation of the weighted Shapley value. Players' values are then updated and used as weights in succeeding approximations until the difference between each player's weight and its value is sufficiently small. No problems with the convergence of this iterative approximation process have been observed in positive weakly monotonic games. A game v is positive if v(S)>0 for all coalitions S. And v is weakly monotonic if $S \subset T$ implies $v(S) \leq v(T)$.

The approximation process may be speeded up by raising the precision of estimates of the successive approximations of the weighted Shapley value toward a desired final precision rather than making all approximations at this level of precision. The final approximation precision for the weighted Shapley values should ordinarily be greater than the precision desired for the approximation of the powerpoint.

Approximation of the proportional value is facilitated by the random order representation illustrated by Equation 44. This relationship may be interpreted as showing that the proportional value is a type of expected value, in the statistical sense of this term. An approximation of the proportional value may be computed using Method 72 as follows. Assume again at Step 74 that standard error is the precision statistic. Equally weighted orderings are used in Step 78, as with the Shapley value. At Step 80 for each ordering r, marginal contributions $M_i^r(v)$ are calculated.

Using this embodiment, a value is calculated for all players. Additionally, the ordered worth product for ordering r is calculated. The ordered with product OWP(r, v) is the product of the worths in game v of all coalitions formed as players are sequentially added to a coalition according to the position in the ordering r. A formula for the ordered worth product is illustrated in Equation 43 in the section above on controlled allocation games. Then create the weighted marginal contributions $WM_i^r(v)$ for each player i, and ordering r, as illustrated in Equation 49.

$$WM_i^r(v) = \frac{M_i^r(v)}{OWP(r,v)} \quad (49)$$

These weighted marginal contributions $WM_i^r(v)$ are the intermediate value functions used to approximate the proportional value.

The proportional value may be approximated from these intermediate value functions as follows. Sum the weighted marginal contributions for a player i as illustrated in Equation 50:

$$SWM_i(v) = \sum_{r \in R^*(N)} WM_i^r(v), \quad (50)$$

where the summation is over all t orderings in the selected collection of orderings R*(N). Only the accumulating weighted sums need be stored in memory.

An estimated proportional value of a player i, $EstPV_i$, is its proportional share of the worth of the grand coalition according to weighted marginal contributions, as illustrated in Equation 51.

$$EstPV_i(v) = \frac{SWM_i(v)}{\sum_{j \in N} SWM_j(v)} v(N) \quad (51)$$

An approximation of the standard error of the approximation may be computed at Step 82 as illustrated in Equation 52 where Std is understood to represent the standard error function.

$$Std(EstPv_i(v)) = \sqrt{t}\ Std(WM_i(v)) \frac{v(N)}{\sum_{j \in N} SWM_j(v)} \quad (52)$$

In order to compute the standard deviation of $WM_i(v)$ the squared value of the $WM_i^r(v)$ terms for all players are be computed at Step 80 and their sum stored. Note that is an approximation of the standard error. The exact standard error may be computed by determining the variance of the denominator of Equation 52 and then utilizing the approach for computing the variance of a ratio of random variables illustrated in Equation 54. In order to compute this sample variance the sample covariances cov($WM_i$,$WM_j$) are computed for all pairs i and j. In order to do this, the products $WM_i WM_j$ are computed for all pairs i and j at Step 80 and their sums are stored. At Step 84, Equation 51 provides the approximation of the proportional value.

An alternative embodiment for approximating the proportional value that does not require calculation of values for all players involves estimating the ratio potentials necessary to calculate the proportional value according to Equation 15. To estimate the proportional value of a player i, both R(N, v) and R(N\i, v) are estimated.

In order to estimate R(N\i, v) for a player i, ordered worth products are also computed at Step 80 without the inclusion of player i. Given an ordering r of the n players, let $r_{-i}$ be the ordering of n-1 players formed by removing player i from r. Then the calculation of the ordered worth product with player i removed from the ordering is illustrated by Equation 53.

$$OWP(v, r_{-i}) = \prod_{m=1}^{n-1} v(S_m^{r-i}) \qquad (53)$$

Ordered worth products $OWP(v, r_{-j})$ are computed at Step 80 for all players j whose proportional values are to be estimated.

Let $\Theta(S)$ be the collection of inverses of the ordered worth products for coalition S generated by the t orderings in $R^*(N)$ at any point in the approximation process for a game with n players. If S=N then this is the collection of all inverses of ordered worth products $OWP(v, r)^{-1}$. If S=N\i then this is the collection of all inverses of ordered worth products $OWP(v, r_{-j})^{-1}$. Let Var be the variance function and Avg be the average function. Then an estimate of the standard error of the approximation that may be computed at Step 82 is illustrated in Equation 54.

$$\hat{\sigma}_z = \frac{\sqrt{t}}{n} \left( \frac{Var(\Theta(N\setminus i))}{Avg(\Theta(N))^2} + Var(\Theta(N))\frac{Avg(\Theta(N\setminus i))^2}{Avg(\Theta(N))^4} - \right.$$

$$\left. 2Cov(\Theta(N), \Theta(N\setminus i))\frac{Avg(\Theta(N\setminus i))}{Avg(\Theta(N))^3} \right)^{\frac{1}{2}} \qquad (54)$$

At Step 84, the expected value of the potential R(N, v) is computed as the harmonic mean of the ordered worth products OWP(r, v), as illustrated in Equation 55.

$$EstR(N, v) = \left( \sum_{r \in R^*(N)} \frac{1}{OWP(v, r)} \right)^{-1} \qquad (55)$$

The expected value of the potential R(N\i, v) is then the harmonic mean of the ordered worth products $OWP_{r-i}$ multiplied by the number of orderings t. This correction is necessary because in expectation, for any ordering r and any player i, the ordering $r_{-i}$ will be t times as likely to occur as the ordering r. Thus the calculation of potential R(N\i, v) at Step 84 is illustrated by Equation 56.

$$EstR(N\setminus i, v) = t \left( \sum_{r \in R^*(N)} \frac{1}{OWP(v, r_{-i})} \right)^{-1} \qquad (56)$$

The estimated proportional value for player i in the game v may then be computed as illustrated in Equation 57.

$$EstPV_i(v) = \frac{EstR(N, v)}{EstR(N\setminus i, v)} \qquad (57)$$

If estimated values are computed for all players, these values may be normalized by dividing by the sum of the estimated proportional values and multiplying by the worth of the grand coalition. Calculation of the estimated ratio potentials at Step 84 may be based on intermediate value functions stored in memory. Calculation may also be done incrementally by computing the inverses of the relevant ordered worth products and accumulating their sums. Also at Step 84, squared values of ordered worth products for the computation of variances and cross products for the computation of covariances are computed and summed.

Approximations for Integrated Proportional Control Games

Two games may have a control game relationship as described in the section "Controlled Allocation Games," above, and one game or both games may be too large to compute values for its players exactly. An approximation of values for an integrated proportional control game may be obtained using Method 52, illustrated in FIG. 6, and Method 72 in the following fashion. Let w be the control game and let v be the allocation game identified at Steps 54, 56 of Method 52. Assume both games have the same set of players and that the control relationship of Step 58 is the default identity relationship. The coalitions identified at Steps 60 and 66 are determined by the orderings selected at Step 78 of Method 72. The worths determined at Steps 62 and 68 of Method 54 are also determined by the selected orderings. The control functions evaluated at Step 64 of Method 54 and the intermediate value functions evaluated at Step 80 of Method 72 are the weighted marginal contributions in cooperative game v with respect to orderings r and ordered worth products in w with respect to orderings r, as illustrated in Equation 58:

$$WM_i^r(v, w) = \frac{M_i^r(v)}{OWP(r, w)} \qquad (58)$$

Then at Step 70 of Method 54 and Steps 82 and 84 of Method 72 the sum of weighted marginal contributions $SWM_i(v, w)$ are calculated as illustrated by Equation 59:

$$SWM_i(v, w) = \sum_{r \in R^*(N)} WM_i^r(v, w), \qquad (59)$$

where, again, the summation is over all y orderings in the collection of orderings $R^*(N)$.

The computation of precision statistics is very similar to the computation of precision statistics for the approximation of the proportional value. For example, to estimate a standard error in Step 82 substitute $WM_i(v, w)$ for $WM_i(v)$ and $SWM_i(v, w)$ for $SWM_i(v)$ in Equation 52.

The estimated integrated proportional control value of a player i, $EstIPC_i$, determined in Step 84 is its proportional share of the worth of the grand coalition according to weighted marginal contributions, as illustrated in Equation 60

$$EstIPC_i(v, w) = \frac{SWM_i(v, w)}{\sum_{j \in N} SWM_j(v, w)} v(N), \qquad (60)$$

where the sum is over all players j in the game.

Reliability of Accuracy Statistics

The reliability of standard error statistics as a measure of the accuracy of the approximation of the proportional and integrated proportional control values depends on the distribution of weighted marginal contributions. This distribution is greatly influenced by the distribution of ordered worth products. In particular, as the ratio of the mean ordered worth product to the minimum ordered worth product gets large, the very small ordered worth products have increasingly disproportionate effect on the approximation, as is made evident by Equation 49. This is because the inverse of the ordered worth product is introduced into this sum through the relationship illustrated in Equations 50 and 51.

Accurate approximation of the proportional value in these circumstances depends on a balanced representation of these orderings in the overall sample of permutations. In games with sufficiently many players and sensitivity to orderings with very small ordered worth products, it may be desirable to sample separately from this population. In this case, weighted marginal contributions $WM_i^r(v)$ must additionally be weighted by a sample selection weight $sw_r$. These weights are applied to computed weighted means and weighted standard errors, the formulas for such are well known to those familiar with the art. In a stratified random ordering procedure sample selection weights may be set so that the probability of selecting any ordering times its sample selection weight is a constant.

If the sample standard error is greater than the selected desired level of precision for any the value of any player, Steps 78 to 82 may be repeated by generating another collection of orderings, calculating intermediate value functions based on these orderings, and computing new estimates for the sample standard error of players' values based the cumulative number of orderings evaluated. This iterative process may continue until the desired level of precision is reached, at which point players' estimated values may be computed.

Estimates of precision statistics such as the standard error are often stable relative to sums or averages, as is known to those familiar with the statistical arts. It is thus possible that the calculation of some or all of the precision statistics for intermediate value functions may be discontinued before the approximation process is completed. With reference to Equation 58, the standard error of the approximation of the proportional value for a player i may be based on updated numbers of orderings used and updated sums of weighted marginal contributions, but without updating the standard error of the sums of the marginal contributions. The sum in the denominator of Equation 58 increases approximately with t. Thus, the true standard deviation of approximation of the proportional value must decline approximately with the square root of the number of orderings used. The use of such a procedure, however, will not save a dramatic amount of computer time. Further, in situations where the distribution of ordered worth products is sufficiently skewed toward zero discontinuing the computation of precision statistics could lead to considerable overestimation of the precision of the approximation.

The methods and system described herein help solve some of the problems associated with resolving joint effects in statistical analysis. The present invention can be used to construct statistical cooperative games and use cooperative game theory to resolve statistical joint effects in a variety of situations. The methods may be applicable to other types of joint effects problems such as those found in engineering, finance and other disciplines.

A number of examples, some including multiple equations were used to illustrate aspects of the present invention. However, the present invention is not limited to these examples or equations, and other examples or equations can also be used with the present invention.

It should be understood that the programs, processes, methods and system described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A computer implemented method for allocating value among players in a cooperative allocation game in order to resolve joint effects in an allocation problem, comprising: identifying a control game and its players; identifying an allocation game and its players; establishing: a control relationship between players or coalitions in the control game and players or coalitions in the allocation game; selecting a set of coalitions in the control game; determining a set of worths for the selected set coalitions in the control game; evaluating one or more control functions using the determined set of worths to determine a set of values for the one or more control functions in the control game; selecting a set of coalitions in the allocation game; determining a set of worths for the selected set of coalitions in the allocation game; and combining the determined set of values for the one or more control functions in the game with the determined set of worths for the selected set of coalitions in the allocation game to determine allocations to players in the allocation game.

2. The method of claim 1 further comprising a computer readable medium having storing therein instructions for causing a processor to execute the steps of the method.

3. The method of claim 1 wherein the allocation game and control game include the same set of players.

4. The method of claim 1 wherein the established control relationship between players in the control game and the allocation game is a default identity relationship.

5. The method of claim 1 wherein:

one of the one or more control functions is a value function of the control game;

a weighted value is used as a value function of the allocation game, or a player's value in the control game is used as the player's weight in the allocation game.

6. The method of claim 5 wherein the weighted value is a weighted Shapley value.

7. The method of claim 1 wherein:

the one or more control functions are ordered worth products of coalitions in the control game;

the set of worths of the selected coalitions in the allocation game are used to determine marginal contributions of individual players;

ordered worth products are used to weight players' marginal contributions in the allocation game, or a value allocated to an individual player in the allocation game is determined by the weighted marginal contributions.

8. The method of claim 7 wherein a player's allocation is an Integrated Proportional Control (IPC) value for an allocation game v and a control game w that is determined by:

$$IPC_i(v, w) = R(N, w) \sum_{r \in R^{\Omega}(N)} OWP(w, r)^{-1}(v(S^r_{r(i)}) - v(S^r_{r(i)} \setminus i)),$$

where R(N, w) is a ratio potential of a grand coalition for the control game w, $OWP(w,r)^{-1}$ is an inverse of an Ordered Worth Product for an ordering r in the control game w, $R^{\Omega}(N)$ is a set of all permutations of orderings of players in N, $S_{r(i)}^r$ is a coalition formed by player i and all players before player i in the ordering r and $v(S_{r(i)}^r)$ is a worth of the coalition $S_{r(i)}^r$.

9. The method of claim 1 wherein the control game is a statistical cooperative game and an explanatory power is used as a performance measure in the statistical cooperative game.

10. The method of claim 1 wherein the allocation game is a statistical cooperative game and total effects is used as a performance measure in the statistical cooperative game.

11. The method of claim 1 wherein a manager performance attribution problem is used to generate both the allocation and control games.

12. The method of claim 1 further comprising:

approximating values in large cooperative controlled allocation games wherein coalitions selected in a control game and in an allocation game are identified by a collection of player orderings for players in the control game and a collection of player orderings for the allocation game.

* * * * *